(12) United States Patent
Lee et al.

(10) Patent No.: US 10,381,161 B2
(45) Date of Patent: Aug. 13, 2019

(54) CAPACITOR STRUCTURE

(71) Applicant: Advanced Semiconductor Engineering, Inc., Kaohsiung (TW)

(72) Inventors: Chi-Chang Lee, Kaohsiung (TW); Wen-Long Lu, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 0 days.

(21) Appl. No.: 15/804,463

(22) Filed: Nov. 6, 2017

(65) Prior Publication Data
US 2019/0139708 A1  May 9, 2019

(51) Int. Cl.
| H01G 4/30 | (2006.01) |
| H01G 4/228 | (2006.01) |
| H01G 4/06 | (2006.01) |
| H01G 4/012 | (2006.01) |
| H01G 4/008 | (2006.01) |
| H01G 4/10 | (2006.01) |

(52) U.S. Cl.
CPC .............. *H01G 4/30* (2013.01); *H01G 4/008* (2013.01); *H01G 4/012* (2013.01); *H01G 4/10* (2013.01); *H01G 4/228* (2013.01)

(58) Field of Classification Search
CPC ........................................................ H01G 4/30
See application file for complete search history.

(56) References Cited

U.S. PATENT DOCUMENTS

| 5,735,027 A * | 4/1998 | Hageman .................. H01G 4/30 29/25.35 |
| 6,370,010 B1 * | 4/2002 | Kuroda .................... H01G 4/232 361/303 |
| 6,507,498 B1 * | 1/2003 | Klee ........................ H03H 1/00 361/301.4 |
| 7,593,214 B2 | 9/2009 | Lee |
| 2012/0147514 A1 * | 6/2012 | Suh ...................... H01G 4/1209 361/301.4 |
| 2017/0200559 A1 | 7/2017 | Lim et al. |
| 2017/0345576 A1 * | 11/2017 | Tsuyoshi .................. H01G 4/33 |

FOREIGN PATENT DOCUMENTS

JP          10012478 A  *  1/1998

* cited by examiner

*Primary Examiner* — Eric W Thomas
(74) *Attorney, Agent, or Firm* — Foley & Lardner LLP; Cliff Z. Liu

(57) ABSTRACT

A capacitor structure includes a first conductive layer, a first insulation layer, a first dielectric layer and a second conductive layer. The first conductive layer includes a first conductive material. The first insulation layer is disposed adjacent to the first conductive layer in a same plane as the first conductive layer. The first dielectric layer is on the first conductive layer and the first insulation layer. The second conductive layer is on the first dielectric layer and includes a second conductive material. The first conductive material is different from the second conductive material.

33 Claims, 32 Drawing Sheets

CAPACITOR STRUCTURE

BACKGROUND

1. Technical Field

The present disclosure relates to a capacitor structure and a method for manufacturing the same.

2. Description of the Related Art

A capacitor structure may include a dielectric layer sandwiched between two conductive layers. For example, a ceramic capacitor is a fixed-value capacitor in which ceramic material acts as the dielectric. It is constructed of alternating layers of ceramic and metal (the metal layers acting as the electrodes). A multilayer ceramic capacitor (MLCC) is constructed of a number of individual capacitors stacked together in parallel and contacted via the terminal surfaces. However, misalignment between the dielectric layers and electrode layers may adversely affect performance or function of the capacitor.

SUMMARY

In one or more embodiments, a capacitor structure includes a first conductive layer, a first insulation layer, a first dielectric layer and a second conductive layer. The first conductive layer includes a first conductive material. The first insulation layer is disposed adjacent to the first conductive layer in a same plane as the first conductive layer. The first dielectric layer is on the first conductive layer and the first insulation layer. The second conductive layer is on the first dielectric layer and includes a second conductive material. The first conductive material is different from the second conductive material.

In one or more embodiments, a capacitor structure includes a first conductive layer, a first insulation layer, a first dielectric layer and a second conductive layer. The first insulation layer is disposed adjacent to the first conductive layer in a same plane as the first conductive layer and includes a first dielectric material. The first dielectric layer is on the first conductive layer and the first insulation layer and includes a second dielectric material. The second conductive layer is on the first dielectric layer. The first dielectric material is different from the second dielectric material.

In one or more embodiments, a method for manufacturing a capacitor structure includes forming a first conductive layer on a substrate; forming a first dielectric layer on the first conductive layer; forming a second conductive layer on the first dielectric layer; forming a first trench to expose a first side surface of the first conductive layer and a first side surface of the second conductive layer; forming a first recess in the first side surface of the first conductive layer; forming a first insulation layer in the first recess; forming a second trench to expose a second side surface of the first conductive layer and a second side surface of the second conductive layer; forming a second recess in the second side surface of the second conductive layer; forming a second insulation layer in the second recess; and forming a first external contact in the second trench and a second external contact in the first trench.

In one or more embodiments, a capacitor structure includes a first conductive layer, a first insulation layer, a first dielectric layer, a second conductive layer and a first external contact. The first insulation layer is disposed adjacent to the first conductive layer in a same plane as the first conductive layer. The first dielectric layer is on the first conductive layer and the first insulation layer. The second conductive layer is on the first dielectric layer. The first external contact is electrically connected to the first conductive layer and includes a first conductive layer and a second conductive layer.

BRIEF DESCRIPTION OF THE DRAWINGS

Common reference numerals are used throughout the drawings and the detailed description to indicate the same or similar elements. Embodiments of the present disclosure will be readily understood from the following detailed description taken in conjunction with the accompanying drawings.

DETAILED DESCRIPTION

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration, and that practical implementations of the structures described herein can be spatially arranged in any orientation or manner, provided that the merits of embodiments of this disclosure are not deviated from by such arrangement.

Figure 1:
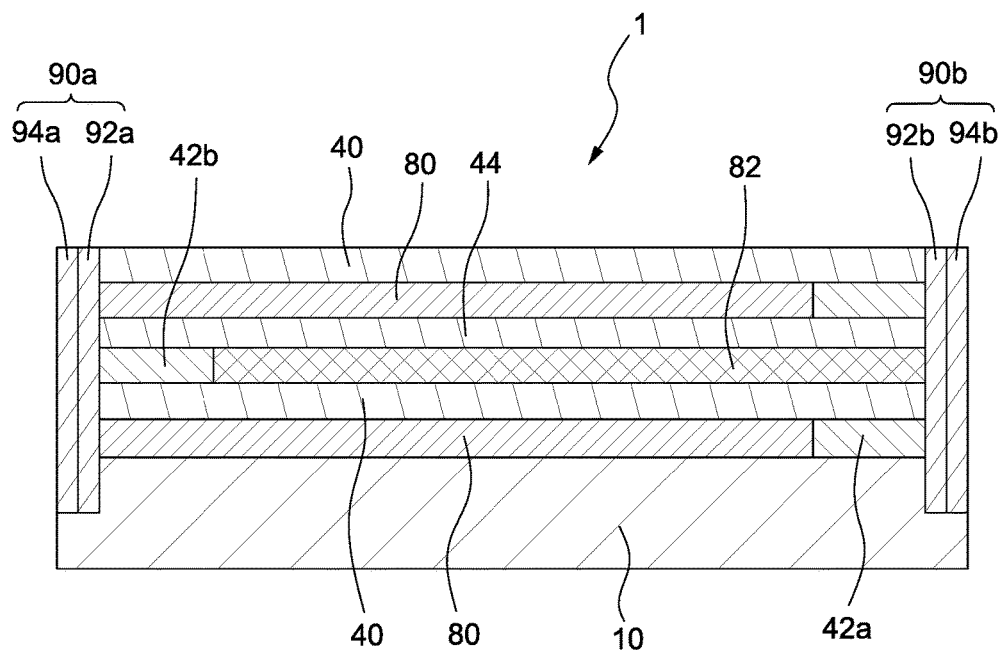
FIG. 1 is a cross-sectional view of a capacitor structure in accordance with some embodiments of the present disclosure.

FIG. 1 is a cross-sectional view of a capacitor structure 1 in accordance with some embodiments of the present disclosure. The capacitor structure 1 includes a substrate 10, one or more conductive layers 80, a conductive layer 82, one or more dielectric layers 40, a dielectric layer 44, one or more insulation layers 42a, an insulation layer 42b, an external contact 90a and an external contact 90b.

One of the conductive layers 80 is disposed on a top surface of the substrate 10. In one or more embodiments, a material of the substrate 10 may be, for example, silicon (Si), a glass or other suitable materials. The conductive layers 80 include a conductive material. In one or more embodiments, a material of the conductive layers 80 (that is, a material included in the conductive layer) may be, for example, copper (Cu), another metal, an alloy, or other suitable conductive materials. Each of the insulation layers 42a is respectively disposed adjacent to a corresponding conductive layer 80 at a substantially same vertical position (e.g. in a same plane as the corresponding conductive layer 80). One of the insulation layers 42a is disposed on the top surface of the substrate 10. In one or more embodiments, one of the insulation layers 42a may be disposed on the dielectric layer 40, or on the dielectric layer 44.

In one or more embodiments, a material of the insulation layers 42a may be, for example, a photosensitive material, a positive polyimide, a positive or negative photoresist or other suitable materials. At least one of the dielectric layers 40 is disposed on the conductive layers 80 and the insulation layers 42a. In one or more embodiments, a material of the dielectric layers 40 may be, for example, tantalum pentoxide ($Ta_2O_5$), another metal oxide, or other suitable materials. In one or more embodiments, the dielectric layers 40 are opaque (e.g. having a transmittance of about 20% or less or about 10% or less for light to which a photosensitive material is exposed, e.g. ultraviolet light).

The conductive layer 82 is disposed on one of the dielectric layers 40. The dielectric layer 44 is disposed on the conductive layer 82 and insulation layer 42b. The conductive layer 82 includes a conductive material. In one or more embodiments, a material of the conductive layer 82 may be, for example, nickel (Ni), another metal, an alloy, or other suitable conductive materials. In one or more embodiments, a material of the dielectric layer 44 may be, for example, $Ta_2O_5$, another metal oxide, or other suitable materials. The insulation layer 42b is disposed on one of the dielectric layers 40. The insulation layer 42b is disposed adjacent to a corresponding conductive layer 82 at a substantially same vertical position (e.g. in a same plane as the corresponding conductive layer 82). In one or more embodiments, the dielectric layer 44 is opaque. One or more materials of the insulation layers 42a and 42b are different from one or more materials of the dielectric layers 40 and 44.

The insulation layer 42b is disposed on a corresponding dielectric layer 40 and disposed adjacent to a corresponding conductive layer 82 at a substantially same vertical position (e.g. in a same plane as the corresponding conductive layer 82). In one or more embodiments, a material of the conductive layer 82 may be Cu, another metal, or an alloy, and a material of the conductive layers 80 may be Ni, another metal, or an alloy. One of the dielectric layers 40 is in contact with the conductive layer 82. The dielectric layer 44 is on the conductive layer 82. In one or more embodiments, the dielectric layer 44 is opaque.

In one or more embodiments, the conductive layers 80 are formed by using a first etchant. An etching rate for etching the conductive layers 80 using the first etchant is greater than an etching rate for etching the conductive layer 82 using the first etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). In one or more embodiments, the conductive layer 82 is formed by using a second etchant. An etching rate for etching the conductive layer 82 using the second etchant is greater than an etching rate for etching the conductive layers 80 using the second etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more).

In one or more embodiments, a material of the insulation layer 42b may be, for example, a photosensitive material, a positive polyimide, a positive or negative photoresist or other suitable materials. In one or more embodiments, the insulation layer 42b is disposed on one of the dielectric layers 40.

The external contact 90a is electrically connected to one or more of the conductive layers 80. The external contact 90b is electrically connected to the conductive layer 82. At least one of the external contact 90a and external contact 90b extends in to the substrate 10. The external contact 90a may include a seed layer 92a and a conductive layer 94a. The external contact 90b may include a seed layer 92b and a conductive layer 94b. In one or more embodiments, a material of the external contacts 90a and 90b may be, for example, Cu, another metal, an alloy, or other suitable materials. Each of the external contacts 90a and 90b and the corresponding insulation layers 42a and 42b can be formed by a sawing operation (e.g. in a single sawing session) after a stacking operation, and etching, alignment and deposition operations, which can be used in manufacturing MLCC capacitors, can be omitted. In comparison with an 80-layer MLCC structure, which has a dielectric layer of 0.5 micrometers (μm) in thickness and has a capacitance value of 19.72 picofarads (pF) in each capacitor unit, one or more embodiments described in the present disclosure can provide for about 500 or more layers of capacitor structure (in a same dimension to the MLCC, e.g. vertically stacked), a lower dielectric layer thickness (less than about 0.3 such as about 0.28 μm or less, about 0.26 μm or less, or about 0.24 μm or less) and a capacitance value of about 61 pF or more per single capacitor unit (e.g. about 61.3 pF or more, about 61.6 pF or more, about 61.9 pF or more, or about 62.2 pF or more). In comparison with an 80-layer MLCC structure, one or more embodiments of a capacitor structure described in the present disclosure having a same or similar total thickness as the MLCC structure can provide for a capacitor structure including about 206 layers or more. In one or more embodiments, a capacitance per μm of one or more embodiments described in the present disclosure is larger than about 25 μF/μm.

Figure 2A:
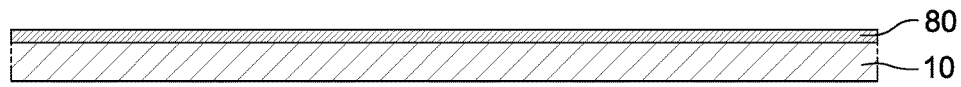
FIG. 2A, FIG. 2B, FIG. 2C, FIG. 2D, FIG. 2E, FIG. 2F, FIG. 2G FIG. 2H, FIG. 2I, FIG. 2J, FIG. 2K, and FIG. 2L illustrate a method for manufacturing the capacitor structure shown in FIG. 1 in accordance with some embodiments.

FIG. 2A through 2L illustrate a method for manufacturing the capacitor structure 1 shown in FIG. 1 in accordance with some embodiments. Referring to FIG. 2A, a substrate 10 is provided. In one or more embodiments, a material of the substrate 10 may be, for example, Si, a glass or other suitable materials. A conductive layer 80 is formed on the substrate 10. In one or more embodiments, a material of the conductive layer 80 may be, for example, Cu, another metal, an alloy, or other suitable conductive materials.

Figure 2B:
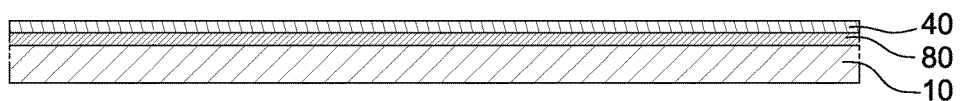

Referring to FIG. 2B, the dielectric layer 40 is formed on the conductive layer 80. In one or more embodiments, a material of the dielectric layer 40 may be, for example, $Ta_2O_5$ or other suitable materials.

Figure 2C:
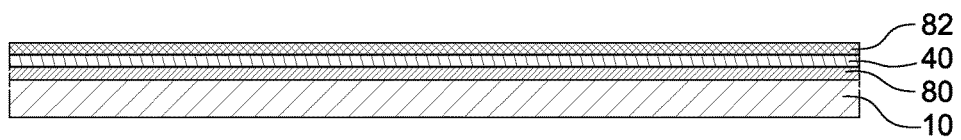

Referring to FIG. 2C, the conductive layer 82 is formed on the dielectric layer 40. The conductive layer 82 includes a conductive material. In one or more embodiments, a material of the conductive layer 82 may be, for example, Ni, another metal, an alloy, or other suitable conductive materials.

Figure 2D:
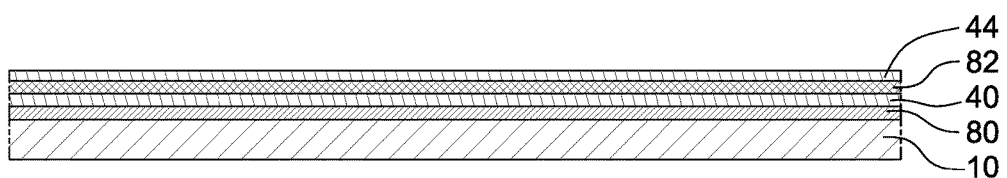

Referring to FIG. 2D, the dielectric layer 44 is formed on the conductive layer 82. In one or more embodiments, a material of the dielectric layer 44 may be, for example, $Ta_2O_5$ or other suitable materials.

Figure 2E:
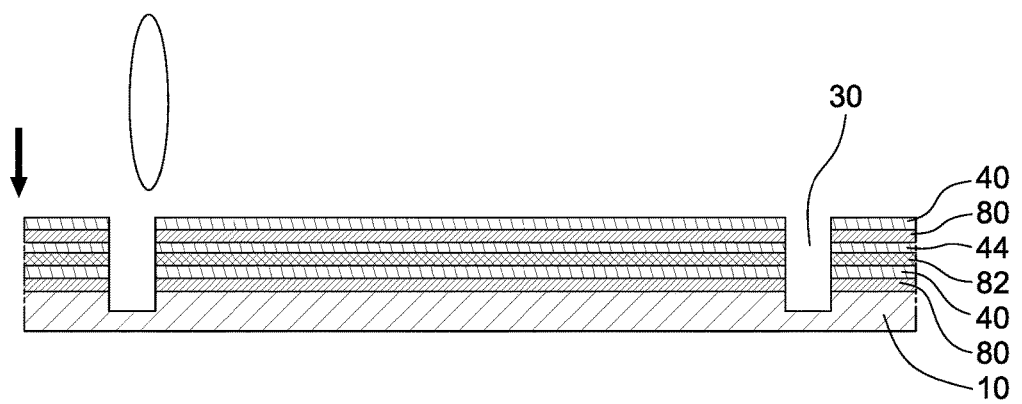

Referring to FIG. 2E, another conductive layer 80 is formed on the dielectric layer 44 and another dielectric layer 40 is formed on the conductive layer 80. Next, a sawing operation is performed to form a trench 30 to expose a first side surface of the conductive layers 80 and a first side surface of the conductive layer 82.

Figure 2F:
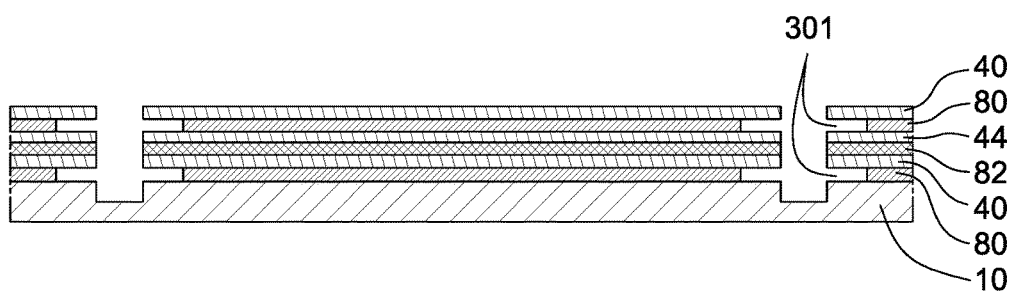

Referring to FIG. 2F, portions of the conductive layers 80 are etched by a first etchant. An etching rate for etching the conductive layers 80 using the first etchant is greater than an etching rate for etching the conductive layer 82 using the first etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layer 82 is thus etched less than the conductive layers 80, since the etching rate for etching the conductive layer 82 using the first etchant is relatively low. One or more first recesses 301 are formed by using the first etchant after the etching operation. The first recesses 301 are recesses in the first side surface of the conductive layers 80. A protection layer (e.g. to protect the conductive layer 82) can be omitted due to different etch rates of the conductive layers 80 and the conductive layer 82 (e.g. the first etchant can have a high etch selectivity ratio).

Figure 2G:
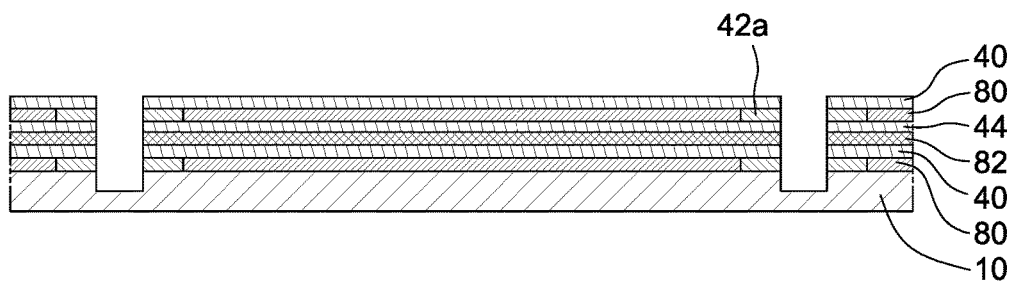

Referring to FIG. 2G a first photosensitive material is disposed in the trench 30 and the first recesses 301. The first photosensitive material is exposed to light (e.g. light directed towards the trench 30). After the exposure, a portion of the first photosensitive material is removed from the trench 30. Since the first photosensitive material in the first recesses 301 is not substantially exposed to light, portions of the first photosensitive material contained in the first recesses 301 may remain substantially unexposed, and may remain in the first recesses 301. The portions of the first photosensitive material contained in the first recesses 301 will constitute at least a portion of one or more insulation layers 42a. In one or more embodiments, a material of the insulation layers 42a may be, for example, a photosensitive material, a positive polyimide, a positive or negative photoresist or other suitable materials.

Figure 2H:
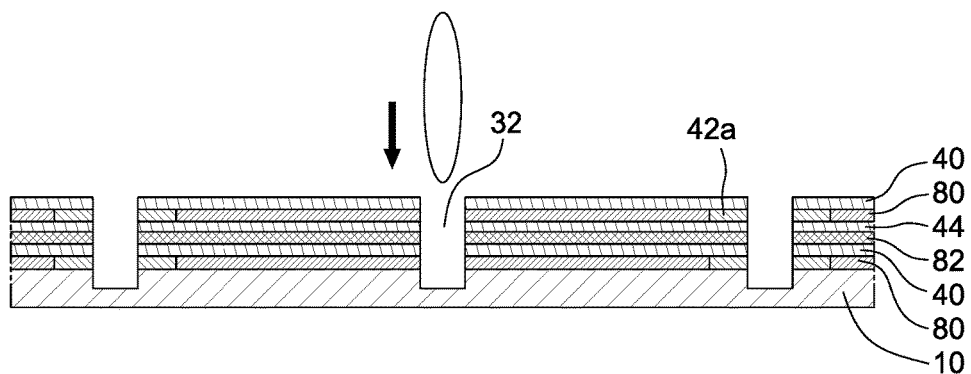

Referring to FIG. 2H, a sawing operation is performed to form the trench 32 to expose second side surfaces of the conductive layers 80 and a second side surface of the conductive layer 82.

Figure 2I:
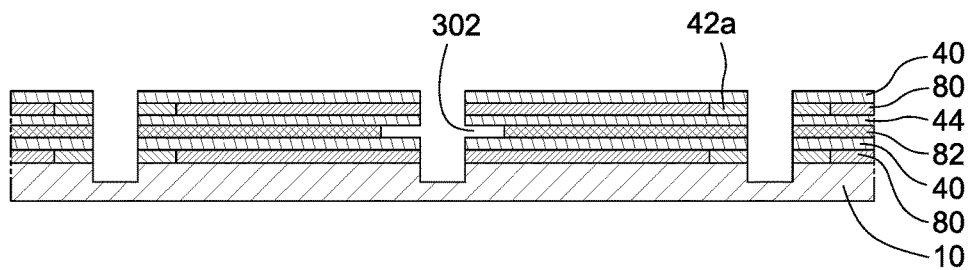

Referring to FIG. 2I, a portion of the conductive layer 82 is etched by a second etchant. An etching rate for etching the conductive layer 82 using the second etchant is greater than an etching rate for etching the conductive layers 80 using the second etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layers 80 thus will be less etched than the conductive layer 82, since the etching rate for etching the conductive layers 80 using the second etchant is relatively low. A second recess 302 is formed by using the second etchant. The second recess 302 is a recess in the second side surface of the second conductive layer 82. A protection layer (e.g. to protect the conductive layers 80) can be omitted due to different etch rates of the conductive layers 80 and the conductive layer 82 (e.g. the second etchant can have a high etch selectivity ratio).

Figure 2J:
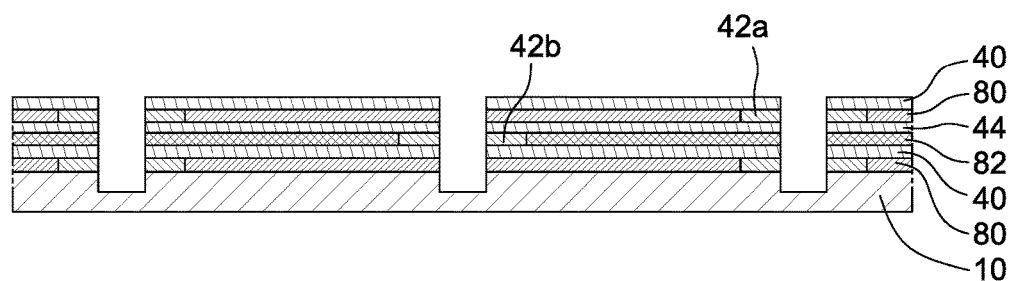

Referring to FIG. 2J, a second photosensitive material is disposed in the trench 32 and the second recess 302. The second photosensitive material is exposed to light. After the exposure, a portion of the second photosensitive material is removed from the trench 32. Since the second photosensitive material in the second recess 302 is not substantially exposed to light, a portion of the second photosensitive material contained in the second recess 302 may remain substantially unexposed, and may remain in the second recesses 302. A portion of the second photosensitive material contained in the second recess 302 will constitute at least a portion of the insulation layer 42b. In one or more embodiments, a material of the insulation layer 42b may be, for example, a photosensitive material, a positive polyimide, a positive or negative photoresist or other suitable materials. In one or more embodiments, the insulation layers 42a and 42b include a same material. The photoresist filled in to the trenches 30 and 32 can be directly removed after the exposure and development, and the removing operation of the photoresist can omit use of a photo mask or can omit an alignment operation.

Figure 2K:
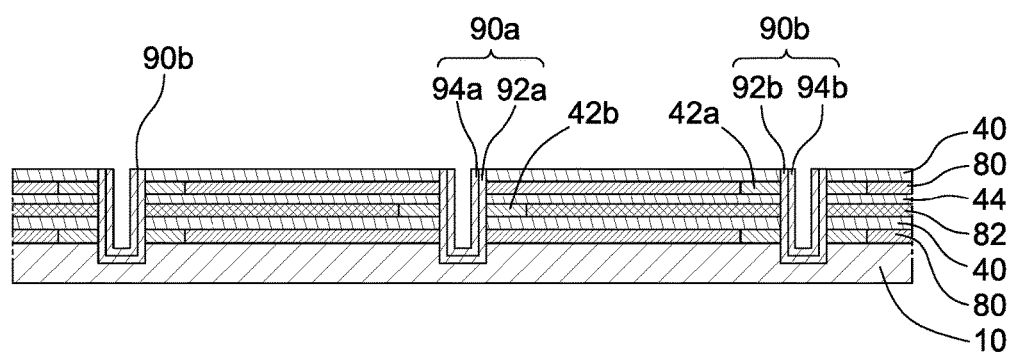

Referring to FIG. 2K, an external contact 90a is formed in the trench 32 and an external contact 90b is formed in the trench 30. The external contact 90a includes two layers (a seed layer 92a and a conductive layer 94a) and the external contact 90b includes two layers (a seed layer 92b and a conductive layer 94b). In one or more embodiments, a material of the external contacts 90a and 90b may be, for example, Cu, another metal, an alloy, or other suitable materials. Capacitors having different capacitance values can be manufactured in a single sawing operation or single sawing session (e.g. by using the design of different scribe lines or by adjusting the positions of the trenches 30 and 32).

Figure 2L:
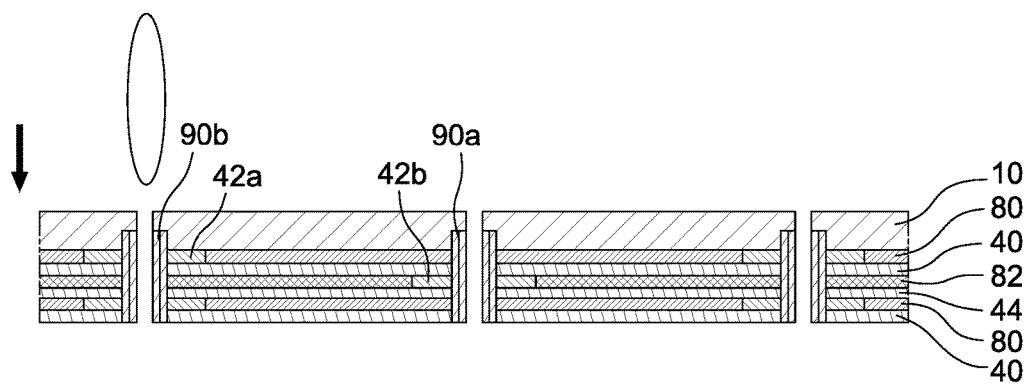

Referring to FIG. 2L, a sawing operation is performed to separate the external contacts 90a and 90b and to divide the substrate 10. The capacitor structure 1 shown in FIG. 1 is obtained after the sawing operation. Each of the external contacts 90a and 90b and the corresponding insulation layers 42a and 42b can be formed in one single sawing operation or one single sawing session after the stacking operation. Some etching, alignment and deposition operations, which are used in manufacturing MLCC capacitors, can thus be omitted. Each of the external contact 90a and the external contact 90b may respectively include a seed layer 92a and a seed layer 92b and may respectively include a conductive layer 94a formed in the trench 32 and a conductive layer 94b formed in the trench 30, and the external contact 90a and the external contact 90b can be formed in a single sawing operation or single sawing session, which can mitigate misalignment issues. This can provide for accurately selecting capacitance values, and a tolerance of the capacitance value can be less than about 5%, since the single sawing operation or single sawing session can reduce misalignment during the stacking process.

Figure 3:
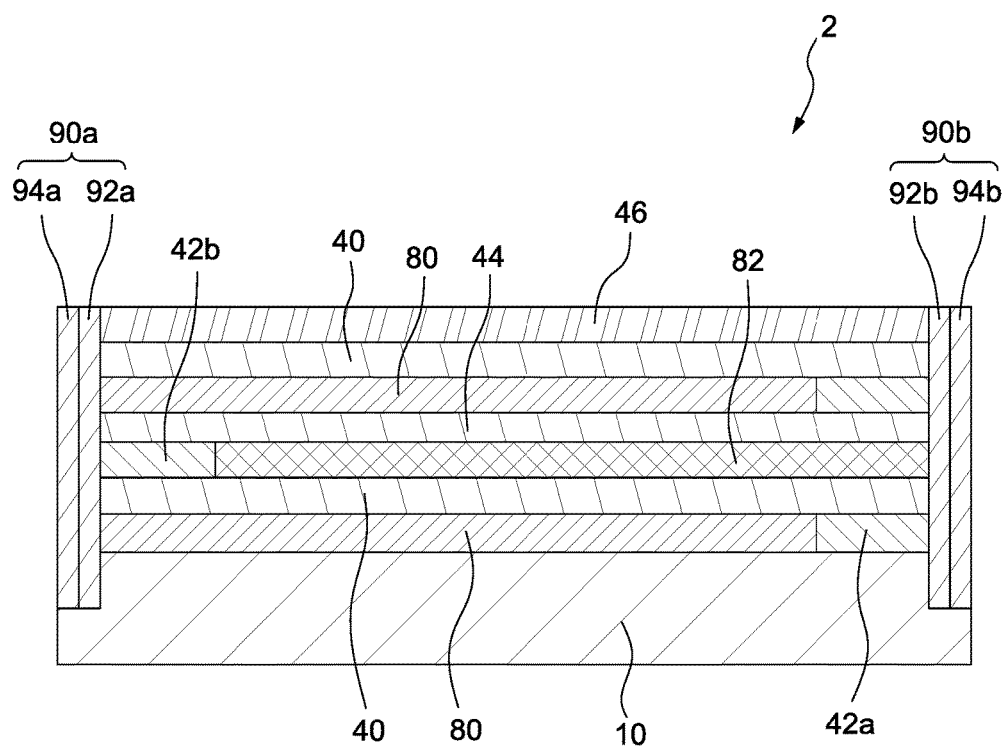
FIG. 3 is a cross-sectional view of a capacitor structure in accordance with some embodiments of the present disclosure.

FIG. 3 is a cross-sectional view of a capacitor structure 2 in accordance with some embodiments of the present disclosure. The capacitor structure 2 show in FIG. 3 is similar to the capacitor structure 1 shown in FIG. 1, and redundant description of same-numbered components may be omitted with respect to FIG. 3. The capacitor structure 2 includes a substrate 10, one or more conductive layers 80, a conductive layer 82, one or more dielectric layers 40, a dielectric layer 44, one or more insulation layers 42a, an insulation layer 42b, an external contact 90a, an external contact 90b, and a protection layer 46.

One of the conductive layers 80 is disposed on the top surface of the substrate 10. In one or more embodiments, a material of the substrate 10 may be, for example, silicon (Si), a glass or other suitable materials. The conductive layers 80 include a conductive material. In one or more embodiments, a material of the conductive layers 80 may be, for example, Cu, another metal, an alloy, or other suitable conductive materials. Each of the insulation layers 42a is disposed adjacent to a corresponding conductive layer 80 at a substantially same vertical position (e.g. in a same plane). One of the insulation layers 42a is disposed on the top surface of the substrate 10. In one or more embodiments, the insulation layer 42a may be disposed on the dielectric layer 40 or on the dielectric layer 44.

In one or more embodiments, a material of the insulation layer 42a may be, for example, a photosensitive material, a positive polyimide, a positive or negative photoresist or other suitable materials. In one or more embodiments, a material of the dielectric layer 40 may be, for example, $Ta_2O_5$ or other suitable materials. In one or more embodiments, the dielectric layer 40 is opaque.

The conductive layer 82 is disposed on one of the dielectric layers 40. In one or more embodiments, a material of the conductive layer 82 may be, for example, Ni, another metal, an alloy, or other suitable conductive materials. In one or more embodiments, a material of the dielectric layer 44 may be, for example, $Ta_2O_5$ or other suitable materials. The insulation layer 42b is disposed adjacent to a corresponding conductive layers 82 at a substantially same vertical position (e.g. in a same plane). In one or more embodiments, the dielectric layer 44 is opaque. One or more materials of the insulation layers 42a and 42b are different from one or more materials of the dielectric layers 40 and 44.

The insulation layer 42b is disposed on a corresponding dielectric layer 40 and disposed adjacent to a corresponding conductive layer 82 at a substantially same vertical position (e.g. in a same plane). In one or more embodiments, a material of the conductive layer 82 may be Cu, another metal, or alloy, and a material of the conductive layers 80 may be Ni, another metal, or alloy. In one or more embodiments, the dielectric layer 44 is opaque.

In one or more embodiments, the conductive layers 80 are formed by using a first etchant. An etching rate for etching the conductive layers 80 using the first etchant is greater than an etching rate for etching the conductive layer 82 using the first etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). In one or more embodiments, the conductive layer 82 is formed by using a second etchant. An etching rate for etching the conductive layer 82 using the second etchant is greater than an etching rate for etching the conductive layers 80 using the second etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more).

In one or more embodiments, a material of the insulation layer 42b may be, for example, a photosensitive material, a positive polyimide, a positive or negative photoresist or other suitable materials. In one or more embodiments, the insulation layer 42b is disposed on one of the dielectric layers 40.

The external contact 90a is electrically connected to the conductive layers 80. The external contact 90b is electrically connected to the conductive layers 82. One of the external contact 90a and external contact 90b extends in to the substrate 10. The external contact 90a may include a seed layer 92a and a conductive layer 94a. The external contact 90b may include a seed layer 92b and a conductive layer 94b. In one or more embodiments, a material of the external contacts 90a and 90b may be, for example, Cu, another metal, an alloy, or other suitable materials. A protection layer 46 is formed on the dielectric layer 40. In one or more embodiments, the protection layer 46 may be an outermost layer of the capacitor structure 2. The protection layer 46 is opaque. In one or more embodiments, a material of the protection layer 46 may be, for example, a polyimide (PI) or other suitable materials.

Figure 4:
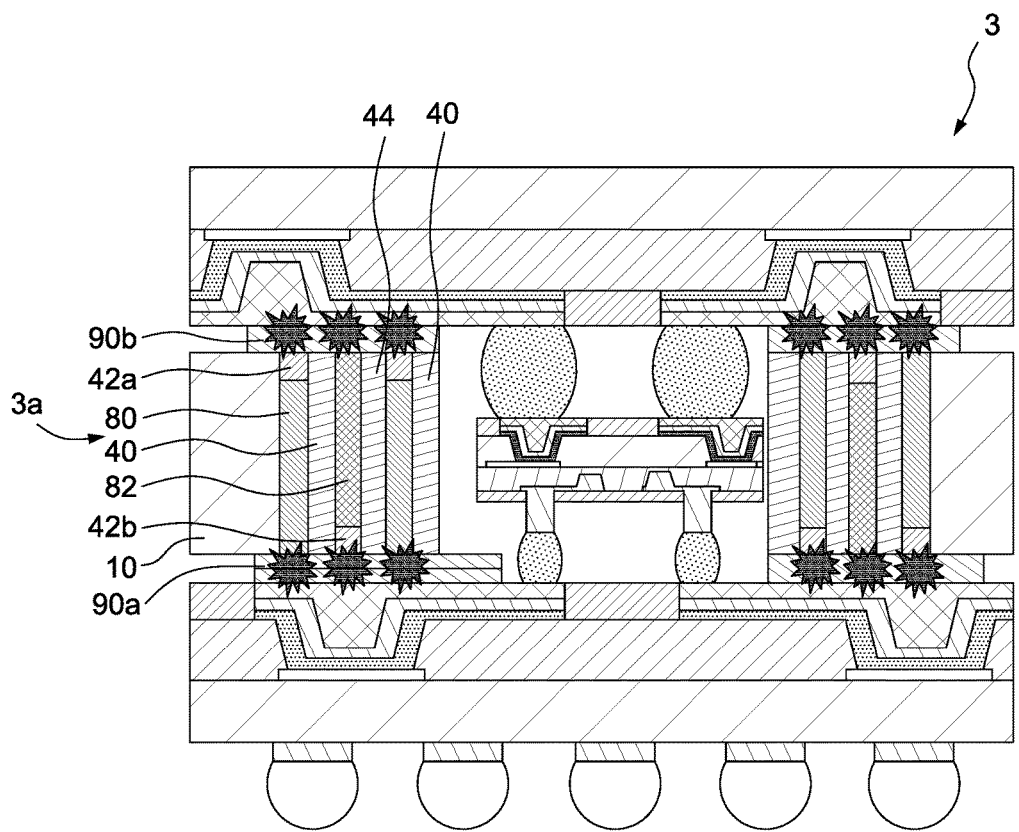
FIG. 4 is a cross-sectional view of a capacitor package structure in accordance with some embodiments of the present disclosure.

FIG. 4 is a cross-sectional view of a capacitor package structure 3 in accordance with some embodiments of the present disclosure. A capacitor structure 3a of the capacitor package structure 3 shown in FIG. 4 is similar to the capacitor structure 1 shown in FIG. 1, and redundant description of same-numbered components may be omitted with respect to FIG. 4. The capacitor structure 3a includes a substrate 10, conductive layers 80, conductive layers 82, dielectric layers 40, dielectric layers 44, insulation layers 42a, insulation layers 42b, an external contact 90a, and an external contact 90b.

The external contact 90a is electrically connected to one or more of the conductive layers 80. The external contact 90b is electrically connected to one or more of the conductive layers 82. In one or more embodiments, the insulation layers 42a and 42b include an anisotropic conductive paste (ACP). In one or more embodiments, the external contacts 90a and 90b include an ACP. In one or more embodiments, the ACP includes conductive particles, and a diameter (e.g., an average diameter) of the conductive particles in the ACP may be approximately in a range from about 2 μm to about 50 μm, and a thickness of the dielectric layers 40 and 44 and the conductive layers 80 and 82 may be less than about 0.3 μm (e.g. less than about 0.27 μm, less than about 0.24 μm, or less than about 0.21 μm. The diameter of the conductive particles in the ACP may be greater than the thickness of the dielectric layers 40 or the dielectric layers 44. The conductive particles in the ACP of the external contact 90b may not be electrically connected to the conductive layers 80 through the insulation layers 42a since the conductive particles have a diameter greater than the thickness of the insulation layers 42a. The conductive particles in the ACP of the external contact 90a may not be electrically connected to the conductive layer 82 through the insulation layers 42b since the conductive particles have a diameter greater than the thickness of the insulation layers 42a. In some embodiments, the ACP of the insulation layers 42a and 42b may omit the conductive particles. In some embodiments the ACP can be implemented in the insulation layers 42a and 42b, which can simplify the method for manufacturing the insulation layers. The ACP can also be implemented in the external contacts 90a and 90b.

Figure 5A:
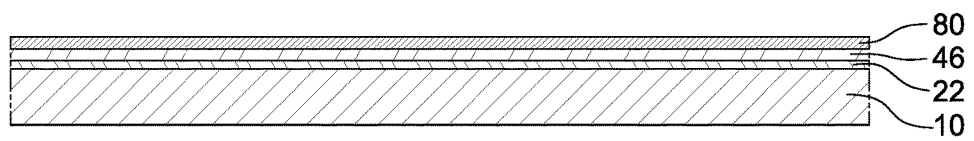
FIG. 5A, FIG. 5B, FIG. 5C, FIG. 5D, FIG. 5E, FIG. 5F, FIG. 5G FIG. 5H, FIG. 5I, FIG. 5J, FIG. 5K, FIG. 5L, and FIG. 5M illustrate a method for manufacturing a capacitor structure in accordance with some embodiments.

FIG. 5A through 5M illustrate a method for manufacturing a capacitor structure 4 in accordance with some embodiments. Referring to FIG. 5A, a substrate 10 is provided. In one or more embodiments, a material of the substrate 10 may be, for example, Si, a glass or other suitable materials. A release layer 22 is formed on a top surface of the substrate 10. A protection layer 46 is formed on the release layer 22. The protection layer 46 is opaque. In one or more embodiments, a material of the protection layer 46 may be, for example, a PI or other suitable materials. Next, a conductive layer 80 is formed on the protection layer 46. In one or more embodiments, a material of the conductive layer 80 may be, for example, Cu, another metal, an alloy, or other suitable conductive materials.

Figure 5B:
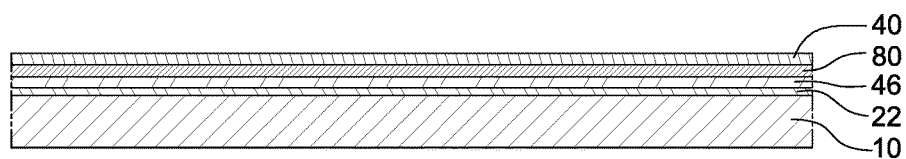

Referring to FIG. 5B, a dielectric layer 40 is formed on the conductive layer 80. In one or more embodiments, a material of the dielectric layer 40 may be, for example, $Ta_2O_5$ or other suitable materials.

Figure 5C:
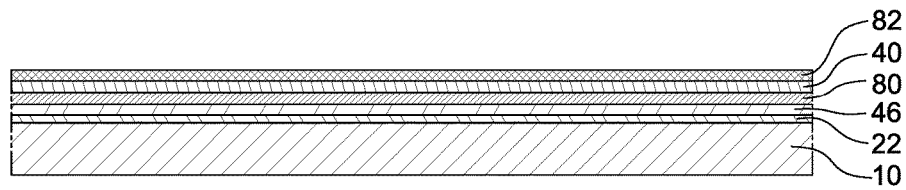

Referring to FIG. 5C, a conductive layer 82 is formed on the dielectric layer 40. The conductive layer 82 includes a conductive material. In one or more embodiments, a material of the conductive layer 82 may be, for example, Ni, another metal, an alloy, or other suitable conductive materials.

Figure 5D:
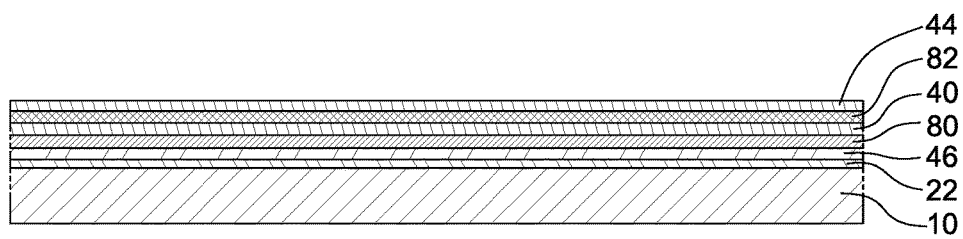

Referring to FIG. 5D, a dielectric layer 44 is formed on the conductive layer 82. In one or more embodiments, a material of the dielectric layer 44 may be, for example, $Ta_2O_5$ or other suitable materials.

Figure 5E:
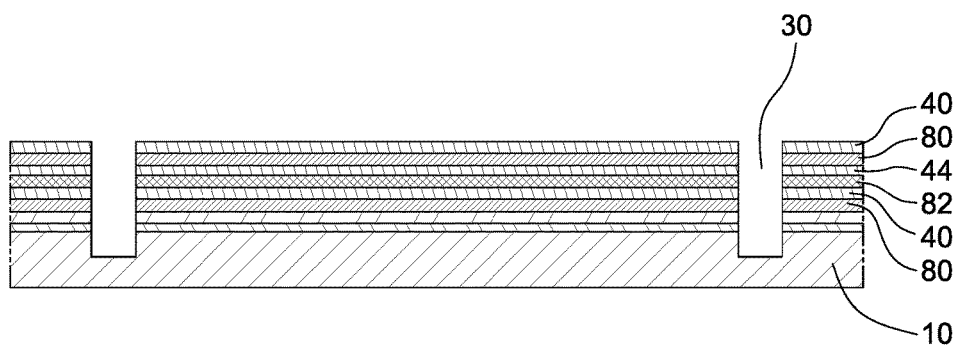

Referring to FIG. 5E, another conductive layer 80 is formed on the dielectric layer 44 and another dielectric layer 40 is formed on the conductive layer 80. Next, a sawing operation is performed to form a trench 30 to expose a first side surface of the conductive layers 80 and a first side surface of the conductive layer 82.

Figure 5F:
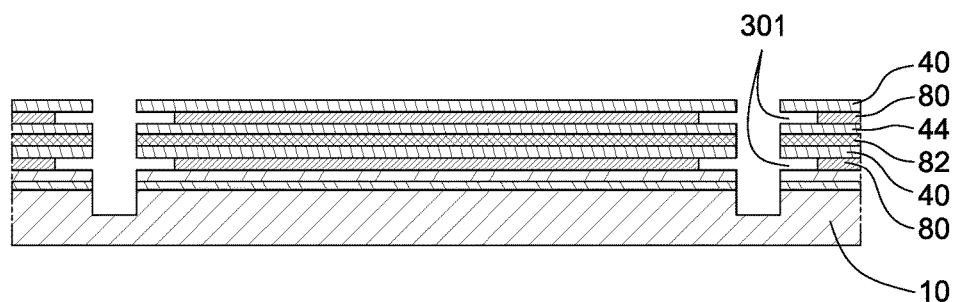

Referring to FIG. 5F, one or more portions of the conductive layers 80 are etched by a first etchant. The etching rate for etching the conductive layers 80 using the first etchant is greater than the etching rate for etching the conductive layer 82 using the first etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layer 82 is thus etched less than the conductive layers 80, since the etching rate for etching the conductive layer 82 using the first etchant is relatively low. One or more first recesses 301 are formed by using the first etchant. The one or more first recesses 301 are recesses in the first side surface of the conductive layers 80.

Figure 5G:
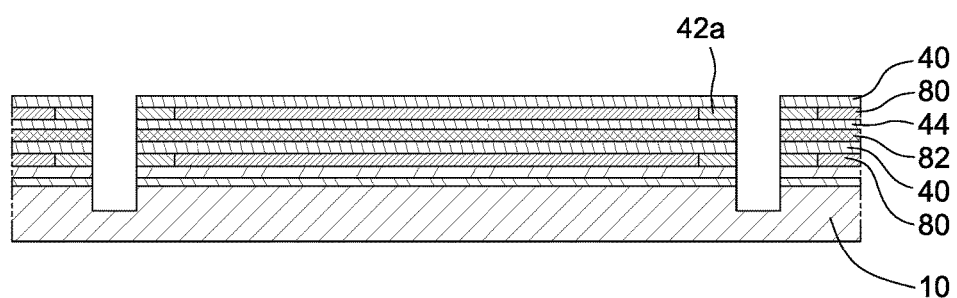

Referring to FIG. 5G a first photosensitive material is disposed in the trench 30 and the first recesses 301. The first photosensitive material is exposed to light. After the exposure, a portion of the first photosensitive material is removed from the trench 30. Since one or more portions of the first photosensitive material in the first recesses 301 are not substantially exposed to light, the portions of the first photosensitive material contained in the first recesses 301 can be substantially unexposed and can remain in the first recesses 301. The portions of the first photosensitive material contained in the first recesses 301 will constitute at least a portion of the insulation layer 42a. In one or more embodiments, a material of the insulation layer 42a may be, for example, a photosensitive material, a positive polyimide, a positive or negative photoresist or other suitable materials.

Figure 5H:
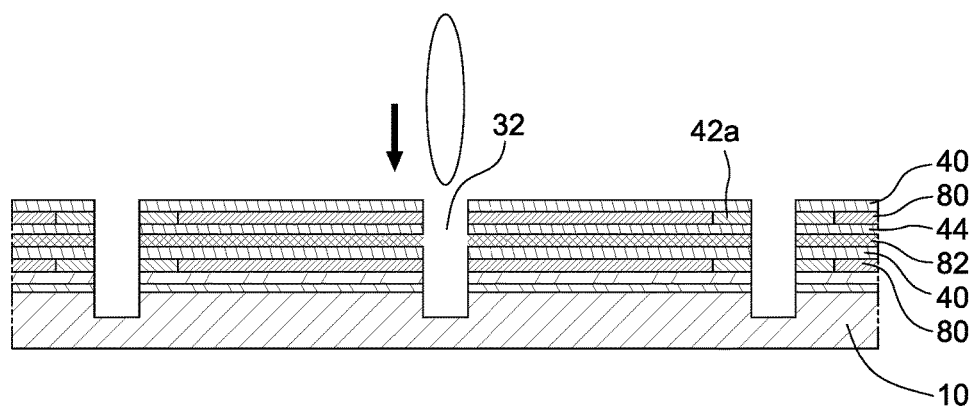

Referring to FIG. 5H, a sawing operation is performed to form a trench 32 to expose a second side surface of the conductive layers 80 and a second side surface of the conductive layer 82.

Figure 5I:
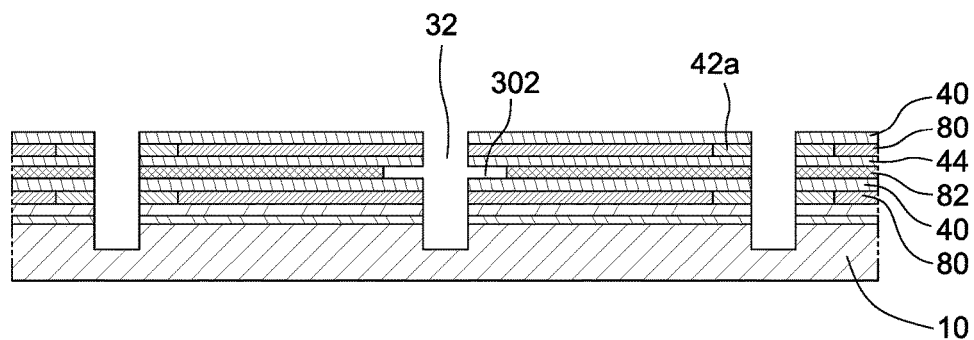

Referring to FIG. 5I, a portion of the conductive layer 82 is etched by a second etchant. An etching rate for etching the conductive layer 82 using the second etchant is greater than an etching rate for etching the conductive layers 80 using the second etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layers 80 are thus etched less than the conductive layer 82, since the etching rate for etching the conductive layers 80 using the second etchant is relatively low. A second recess 302 is formed by using the second etchant. The second recess 302 is a recess in the second side surface of the second conductive layer 82.

Figure 5J:
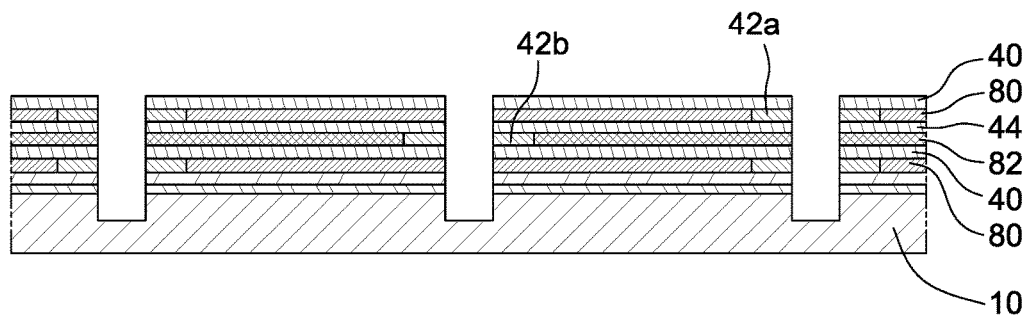

Referring to FIG. 5J, a second photosensitive material is disposed in the trench 32 and the second recess 302. The second photosensitive material is exposed to light. After the exposure, a portion of the second photosensitive material is removed from the trench 32. Since a portion of the second photosensitive material in the second recess 302 is not substantially exposed to light, the portion of the second photosensitive material contained in the second recess 302 may be substantially unexposed and can remain in the second recess 302. The portion of the second photosensitive material contained in the second recess 302 will constitute at least a portion of the insulation layer 42b. In one or more embodiments, a material of the insulation layer 42b may be, for example, a photosensitive material, a positive polyimide, a positive or negative photoresist or other suitable materials. In one or more embodiments, the insulation layers 42a and 42b include a same material.

Figure 5K:
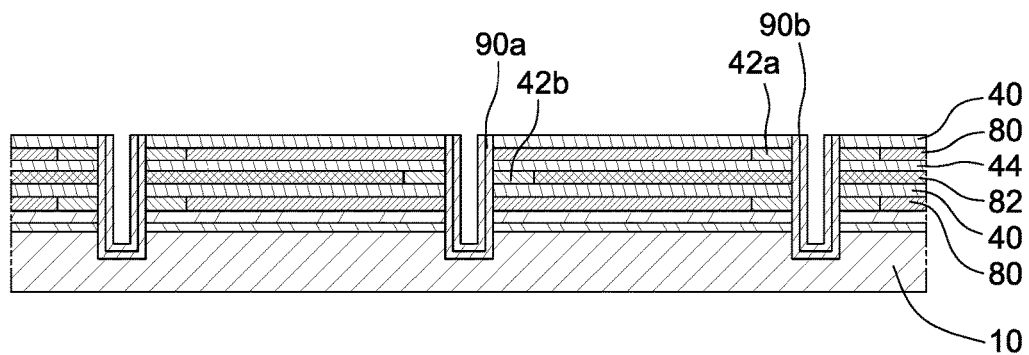

Referring to FIG. 5K, an external contact 90a is formed in the trench 32 and an external contact 90b is formed in the trench 30. The external contact 90a includes two layers (a seed layer 92a and a conductive layer 94a) and the external contact 90b includes two layers (a seed layer 92b and a conductive layer 94b). In one or more embodiments, a material of the external contacts 90a and 90b may be, for example, Cu, another metal, an alloy, or other suitable materials.

Figure 5L:
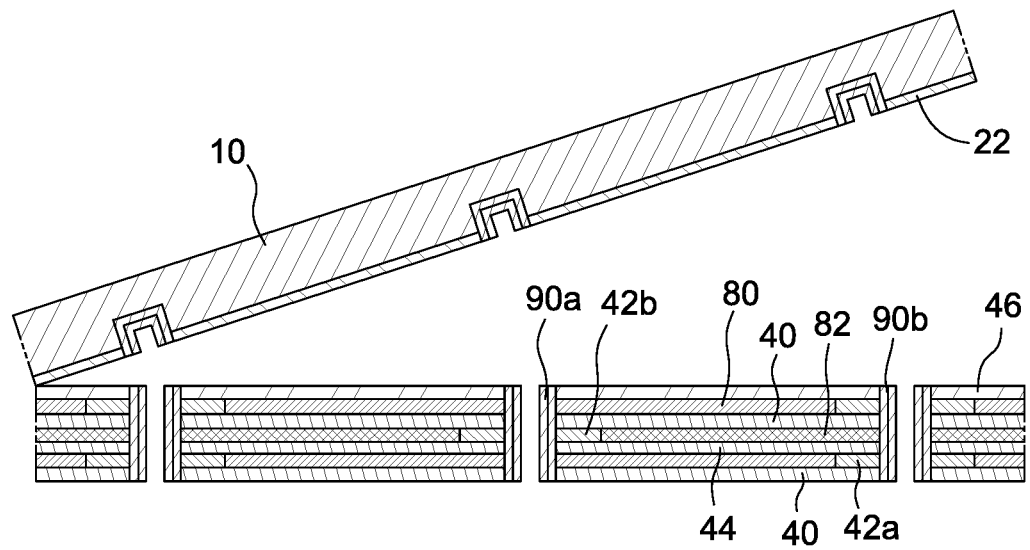

Referring to FIG. 5L, the release layer 22 is separated from the protection layer 46 in a removing operation. The substrate 10 is separated from the protection layer 46 through the removing operation of the release layer 22.

Figure 5M:
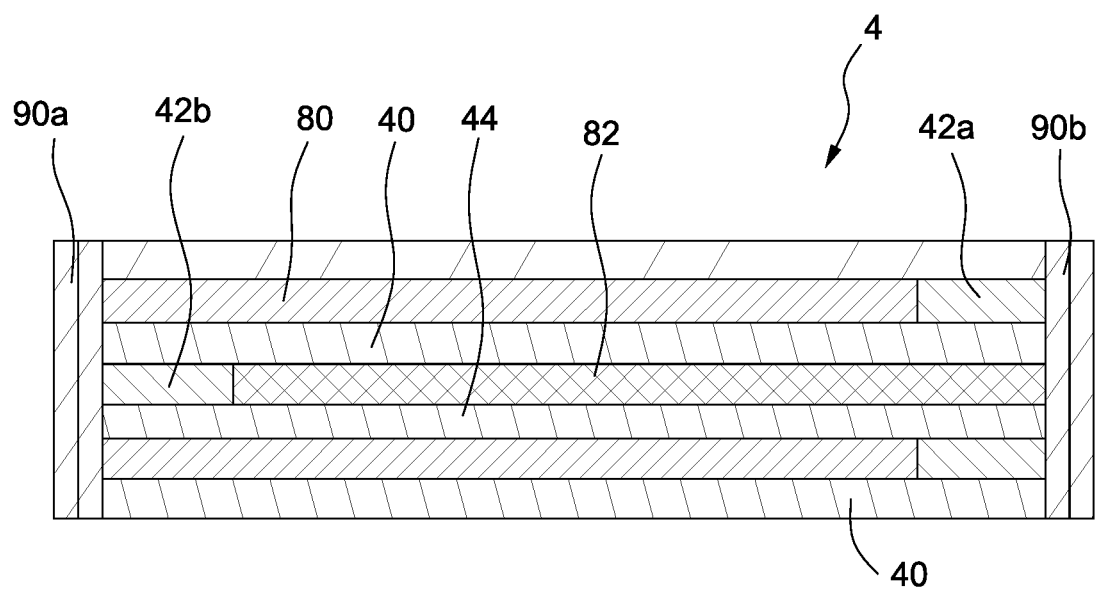

Referring to FIG. 5M, after removing the substrate 10 and the release layer 22, the capacitor structure 4 is obtained.

Figure 6A:
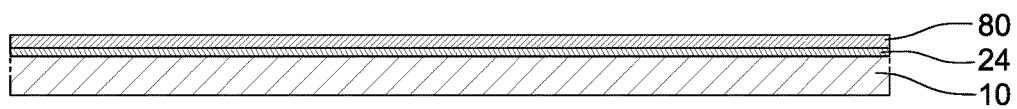
FIG. 6A, FIG. 6B, FIG. 6C, FIG. 6D, FIG. 6E, FIG. 6F, FIG. 6G FIG. 6H, FIG. 6I, FIG. 6J, FIG. 6K, and FIG. 6L illustrate a method for manufacturing a capacitor structure in accordance with some embodiments.
Figure 6B:
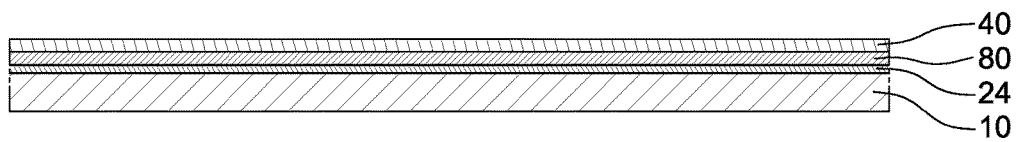
Figure 6C:
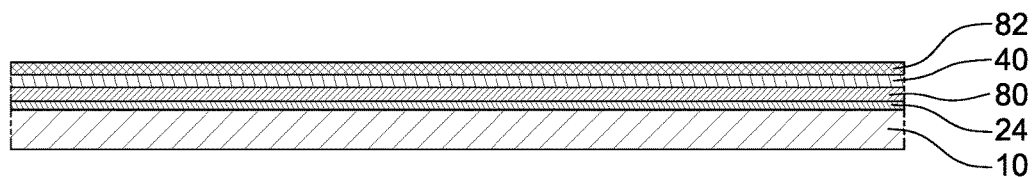
Figure 6D:
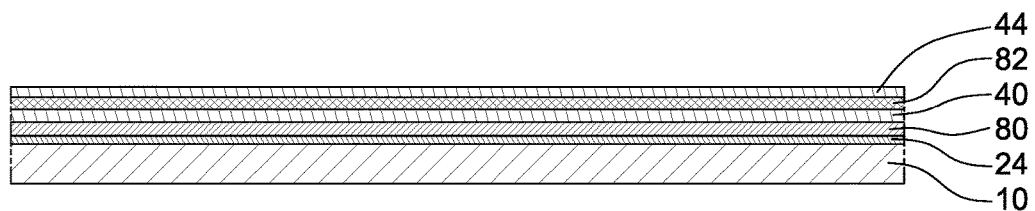
Figure 6E:
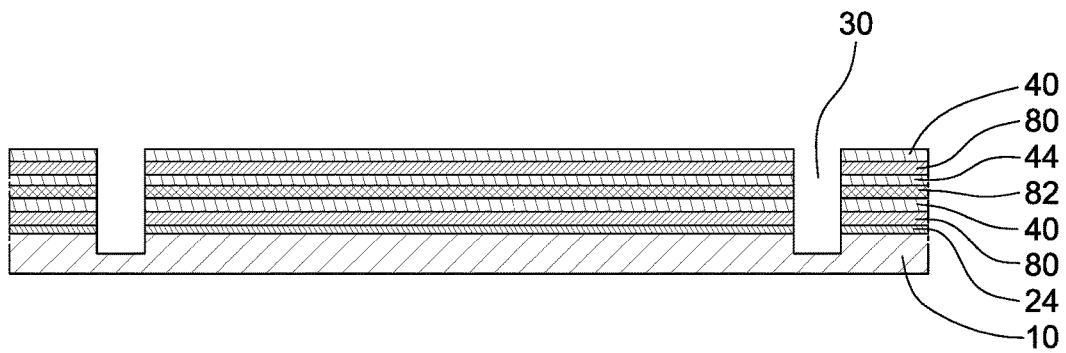
Figure 6F:
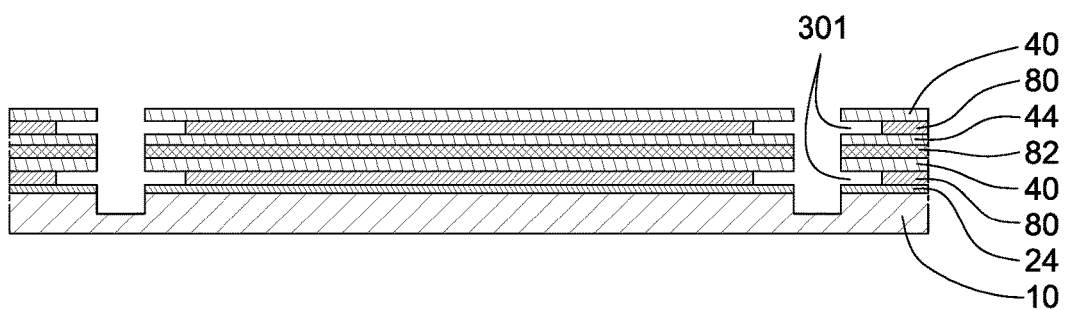
Figure 6G:
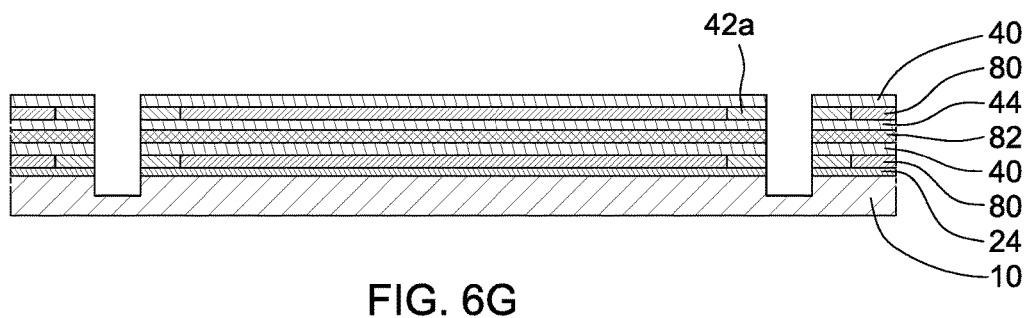
Figure 6H:
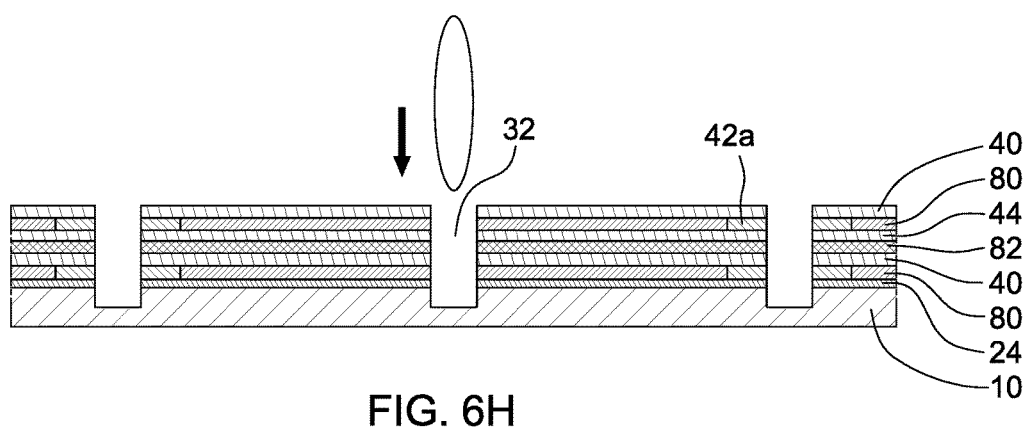
Figure 6I:
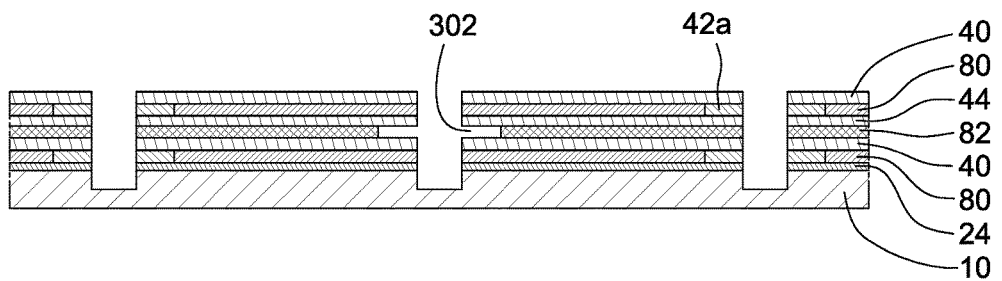
Figure 6J:
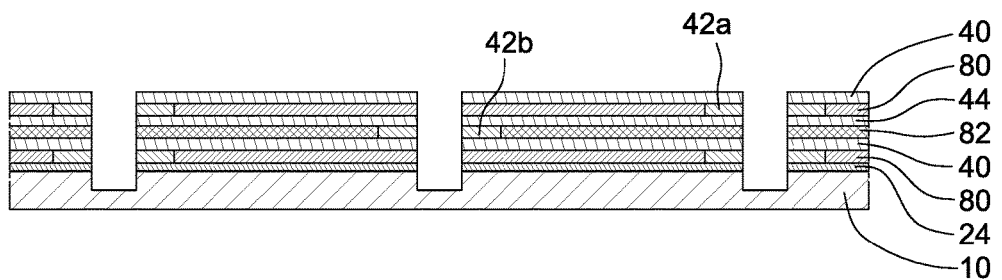
Figure 6K:
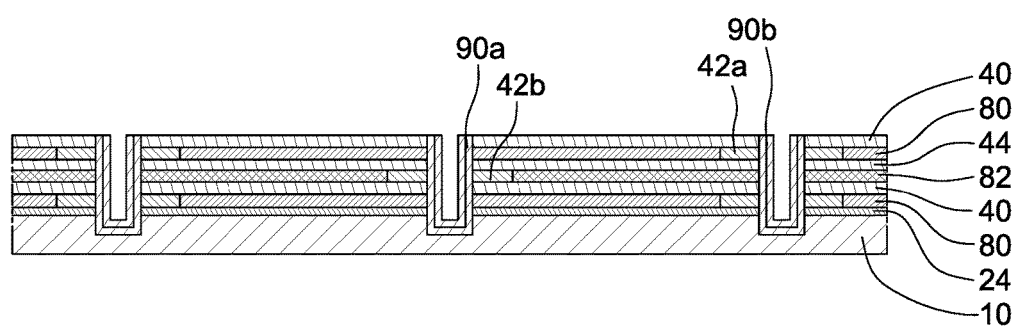
Figure 6L:
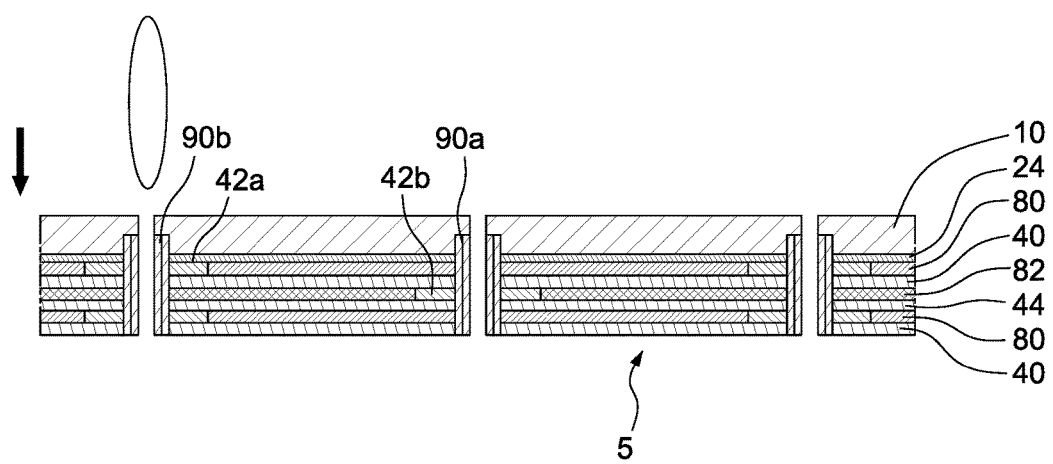

FIG. 6A through 6L illustrate a method for manufacturing a capacitor structure 5 shown in FIG. 6L in accordance with some embodiments. Referring to FIG. 6A, a substrate 10 is provided. In one or more embodiments, a material of the substrate 10 may be, for example, Si, a glass or other suitable materials. A layer 24 is formed on the top surface of the substrate 10. In one or more embodiments, the layer 24 may be an oxide or nitride layer or other suitable layer. A conductive layer 80 is formed on the layer 24. In one or more embodiments, a material of the conductive layer 80 may be, for example, aluminum (Al), another metal, an alloy, or other suitable conductive materials.

Referring to FIG. 6B, a dielectric layer 40 is formed by oxidizing a portion of the conductive layer 80. In one or more embodiments, a material of the dielectric layer 40 may be, for example, aluminum oxide ($Al_2O_3$) or other suitable materials.

Referring to FIG. 6C, a conductive layer 82 is formed on the dielectric layer 40. The conductive layer 82 includes a conductive material. In one or more embodiments, a material of the conductive layer 82 may be, for example, Titanium (Ti), another metal, an alloy, or other suitable conductive materials.

Referring to FIG. 6D, a dielectric layer 44 is formed by oxidizing a portion of the conductive layer 82. In one or more embodiments, a material of the dielectric layer 44 may be, for example, titanium oxide ($Ti_2O_3$) or other suitable materials.

Referring to FIG. 6E, another conductive layer 80 is formed on the dielectric layer 44 and another dielectric layer 40 is formed by oxidizing a portion of the conductive layer 80. Next, a sawing operation is performed to form the trench 30 to expose a first side surface of the conductive layers 80 and a first side surface of the conductive layer 82.

Referring to FIG. 6F, one or more portions of the conductive layers 80 are etched by a first etchant. An etching rate for etching the conductive layer 80 using the first etchant is greater than an etching rate for etching the conductive layer 82 using the first etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layer 82 is thus etched less than the conductive layers 80, since the etching rate for etching the conductive layer 82 using the first etchant is relatively low. One or more first recesses 301 are formed by using the first etchant after the etching operation. The first recesses 301 are recesses in the first side surface of the conductive layers 80.

Referring to FIG. 6G a first photosensitive material is disposed in the trench 30 and the first recesses 301. The first photosensitive material is exposed to light. After the exposure, a portion of the first photosensitive material is removed from the trench 30. Since portions of the first photosensitive material in the first recesses 301 is not substantially exposed to light, the portion of the first photosensitive material contained in the first recesses 301 can be substantially unexposed and can remain in the first recesses 301. The portions of the first photosensitive material contained in the first recesses 301 will constitute at least a portion of the insulation layers 42a. In one or more embodiments, a material of the insulation layers 42a may be, for example, a photosensitive material, a positive polyimide, a positive or negative photoresist or other suitable materials.

Referring to FIG. 6H, a sawing operation is performed to form a trench 32 to expose a second side surface of the conductive layers 80 and a second side surface of the conductive layer 82.

Referring to FIG. 6I, a portion of the conductive layer 82 is etched by a second etchant. An etching rate for etching the conductive layer 82 using the second etchant is greater than an etching rate for etching the conductive layers 80 using the second etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layers 80 are thus etched less than the conductive layer 82, since the etching rate for etching the conductive layers 80 using the second etchant is relatively low. A second recess 302 is formed by using the second etchant after the etching operation. The second recess 302 is a recess in the second side surface of the second conductive layer 82.

Referring to FIG. 6J, a second photosensitive material is disposed in the trench 32 and the second recess 302. The second photosensitive material is exposed to light. After the exposure, a portion of the second photosensitive material is removed from the trench 32. Since the second photosensitive material in the second recess 302 is not substantially exposed to light, the portion of the second photosensitive material contained in the second recess 302 can be substantially unexposed and can remain in the second recess 302. The portion of the second photosensitive material contained in the second recess 302 will constitute at least a portion of the insulation layer 42b. In one or more embodiments, a material of the insulation layer 42b may be, for example, a photosensitive material, a positive polyimide, a positive or negative photoresist or other suitable materials. In one or more embodiments, the insulation layers 42a and 42b include a same material. The photoresist filled in to the trenches 30 and 32 can be directly removed after the exposure and development, and the removing operation of the photoresist may omit use of a photo mask or may omit an alignment operation. In one or more embodiments, a material of the conductive layers 80 may be Ti and a material of the conductive layer 82 may be Al, another metal, or alloy.

Referring to FIG. 6K, an external contact 90a is formed in the trench 32 and an external contact 90b is formed in the trench 30. The external contact 90a includes two layers (a seed layer 92a and a conductive layer 94a) and the external contact 90b includes two layers (a seed layer 92b and a conductive layer 94b). In one or more embodiments, a material of the external contacts 90a and 90b may be, for example, Cu, another metal, an alloy, or other suitable materials.

Referring to FIG. 6L, a sawing operation is performed to separate the external contacts 90a and 90b and to divide the substrate 10. The capacitor structure 5 shown in FIG. 6L is obtained after the sawing operation.

Figure 7A:
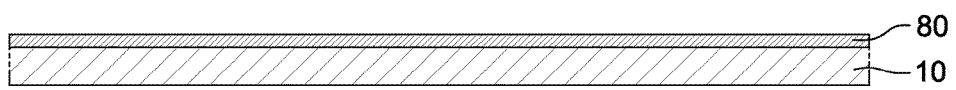
FIG. 7A, FIG. 7B, FIG. 7C, FIG. 7D, FIG. 7E, FIG. 7F, FIG. 7G FIG. 7H, FIG. 7I, FIG. 7J, and FIG. 7K illustrate a method for manufacturing a capacitor package structure in accordance with some embodiments.

FIG. 7A through 7K illustrate a method for manufacturing a capacitor package structure 3 shown in FIG. 4 in accordance with some embodiments. Referring to FIG. 7A, a substrate 10 is provided. In one or more embodiments, a material of the substrate 10 may be, for example, Si, a glass or other suitable materials. A conductive layer 80 is formed on the substrate 10. In one or more embodiments, a material of the conductive layer 80 may be, for example, Cu, another metal, an alloy, or other suitable conductive materials.

Figure 7B:
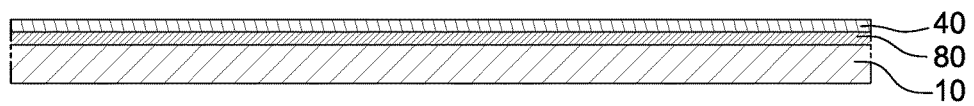

Referring to FIG. 7B, a dielectric layer 40 is formed on the conductive layer 80. In one or more embodiments, a material of the dielectric layer 40 may be, for example, $Ta_2O_5$ or other suitable materials.

Figure 7C:
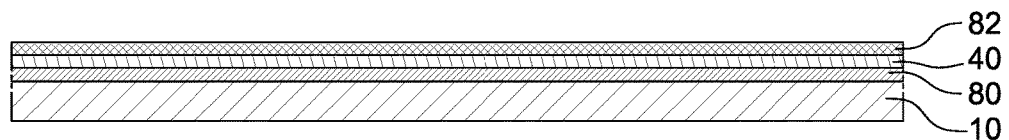

Referring to FIG. 7C, a conductive layer 82 is formed on the dielectric layer 40. The conductive layer 82 includes a conductive material. In one or more embodiments, a material of the conductive layer 82 may be, for example, Ni, another metal, an alloy, or other suitable conductive materials.

Figure 7D:
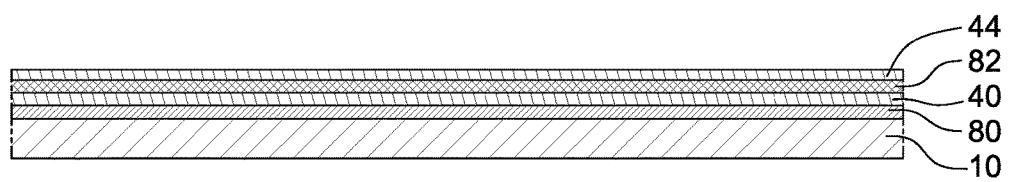

Referring to FIG. 7D, a dielectric layer 44 is formed on the conductive layer 82. In one or more embodiments, a material of the dielectric layer 44 may be, for example, $Ta_2O_5$ or other suitable materials.

Figure 7E:
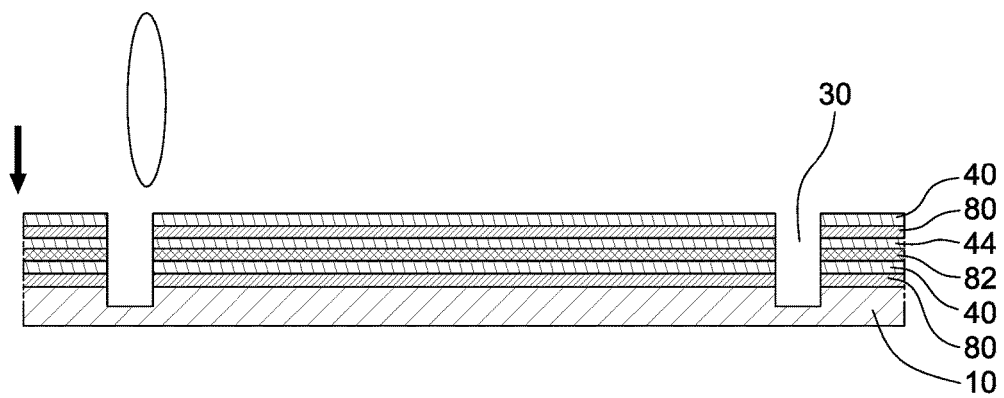

Referring to FIG. 7E, another conductive layer 80 is formed on the dielectric layer 44 and another dielectric layer 40 is formed on the conductive layer 80. Next, a sawing operation is performed to form a trench 30 to expose a first side surface of the conductive layers 80 and a first side surface of the conductive layer 82.

Figure 7F:
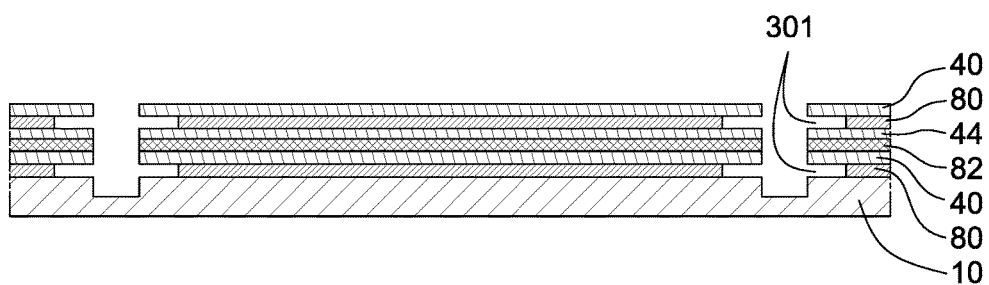
Figure 7G:
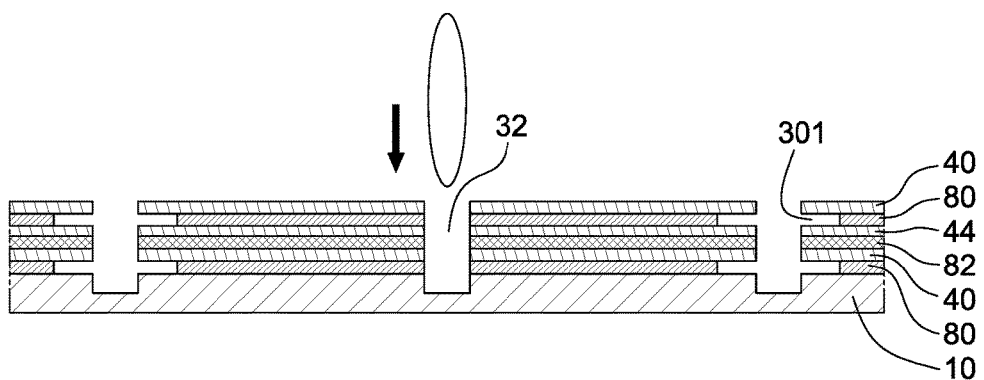

Referring to FIG. 7F, one or more portions of the conductive layers 80 are etched by a first etchant. An etching rate for etching the conductive layers 80 using the first etchant is greater than an etching rate for etching the conductive layer 82 using the first etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layer 82 is thus etched less than the conductive layers 80, since the etching rate for etching the conductive layer 82 using the first etchant is relatively low. One or more first recesses 301 are formed by using the first etchant. The first recesses 301 are recesses in the first side surface of the conductive layers 80.

Referring to FIG. 7Q a sawing operation is performed to form the trench 32 to expose a second side surface of the conductive layers 80 and a second side surface of the conductive layer 82.

Figure 7H:
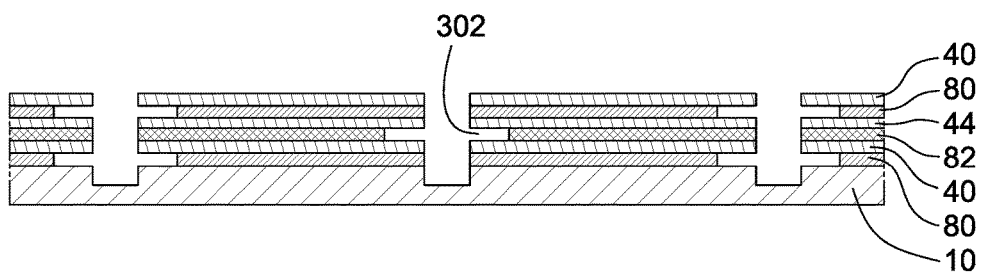

Referring to FIG. 7H, a portion of the conductive layer 82 is etched by a second etchant. An etching rate for etching the conductive layer 82 using the second etchant is greater than an etching rate for etching the conductive layers 80 using the second etchant (e.g. is greater by a factor of about 1.1 or more, is greater by a factor of about 1.2 or more, is greater by a factor of about 1.3 or more, is greater by a factor of about 1.4 or more, or is greater by a factor of about 1.5 or more). The conductive layers 80 are thus etched less than the conductive layer 82, since the etching rate for etching the conductive layers 80 using the second etchant is relatively low. A second recess 302 is formed by using the second etchant. The second recess 302 is a recess in the second side surface of the second conductive layer 82.

Figure 7I:
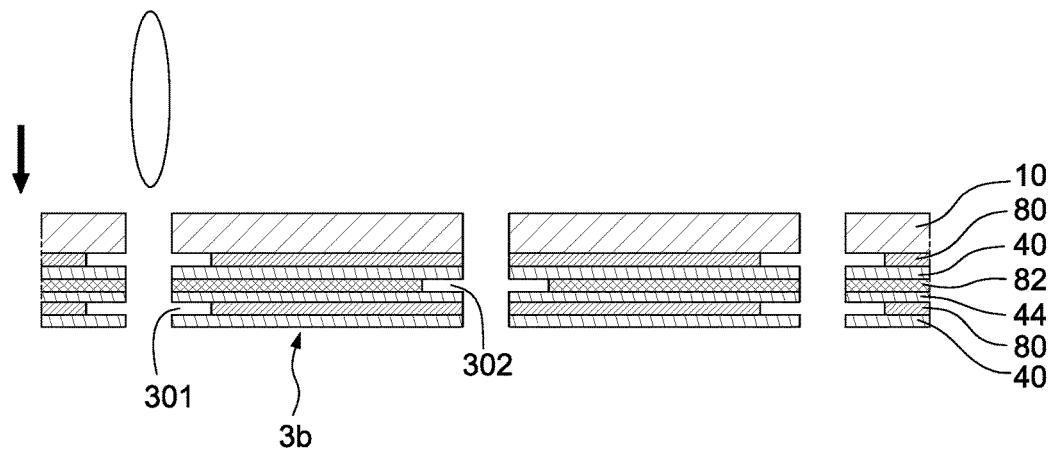

Referring to FIG. 7I, a sawing operation is performed to divide the substrate 10. Next, the separated unit 3b is obtained.

Figure 7J:
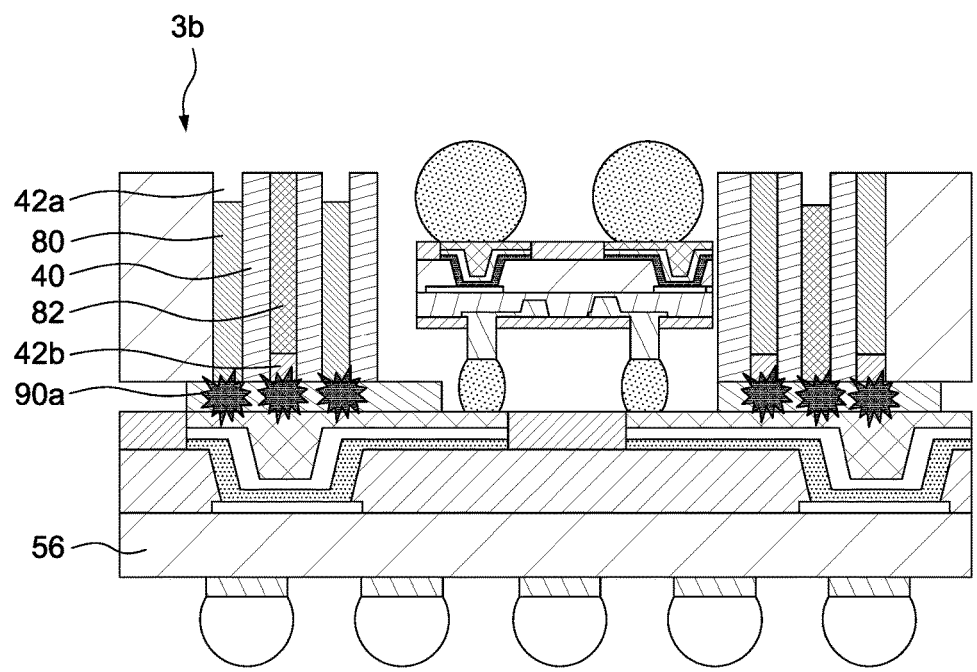

Referring to FIG. 7J, the separated unit 3b is disposed on a substrate 56 having interconnect circuits disposed thereon. The separated unit 3b is electrically connected to a conductive pad of the substrate 56 through an external contact 90a. The external contact 90a includes an ACP, such as an ACP that does not include conductive particles, or that is substantially devoid of conductive particles, or that does not include sufficient conductive particles to establish an electrical connection. The ACP filled in to the second recess 302 is substantially non-conductive (e.g. since the ACP does not include the conductive particles). The ACP is filled in to the second recess 302 and can serve as the insulation layer 42b.

Figure 7K:
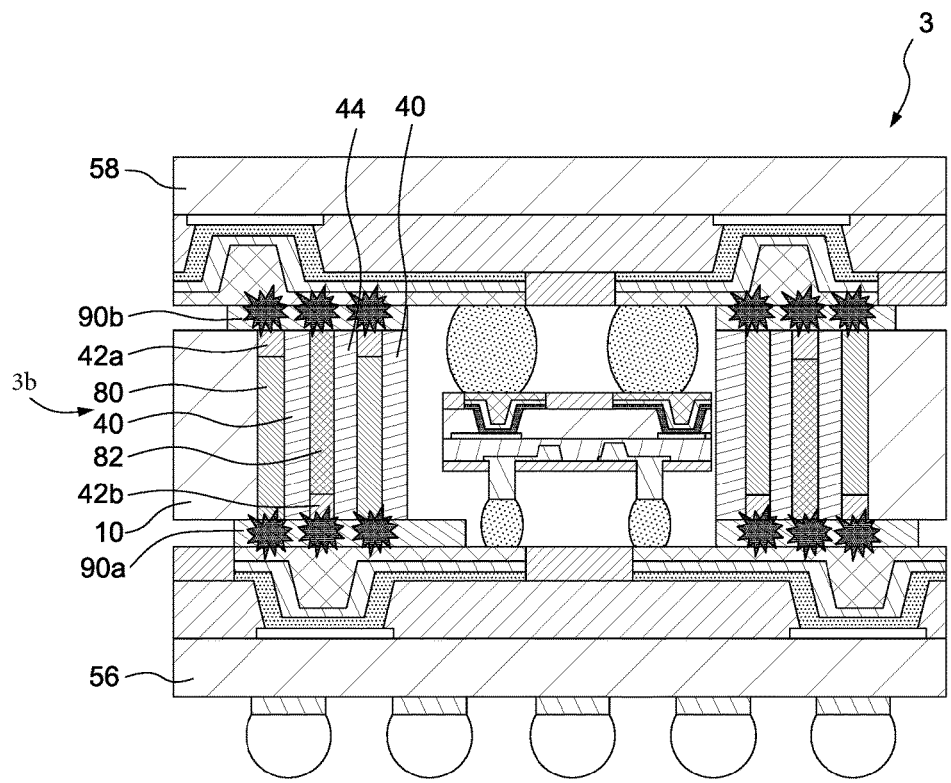

Referring to FIG. 7K, a substrate 58 having interconnect circuits disposed thereon is disposed to cover the separated unit 3b. The separated unit 3b is electrically connected to a conductive pad of the substrate 58 through an external contact 90b. The external contact 90b includes an ACP, such as an ACP that does not include conductive particles, or that is substantially devoid of conductive particles, or that does not include sufficient conductive particles to establish an electrical connection. The ACP filled in to the first recesses 301 is non-conductive (e.g. since the ACP does not include the conductive particles). The ACP is filled in to the first recesses 301 and can serve as the insulation layers 42a. Next, the capacitor package structure 3 shown in FIG. 4 is obtained.

Figure 8:
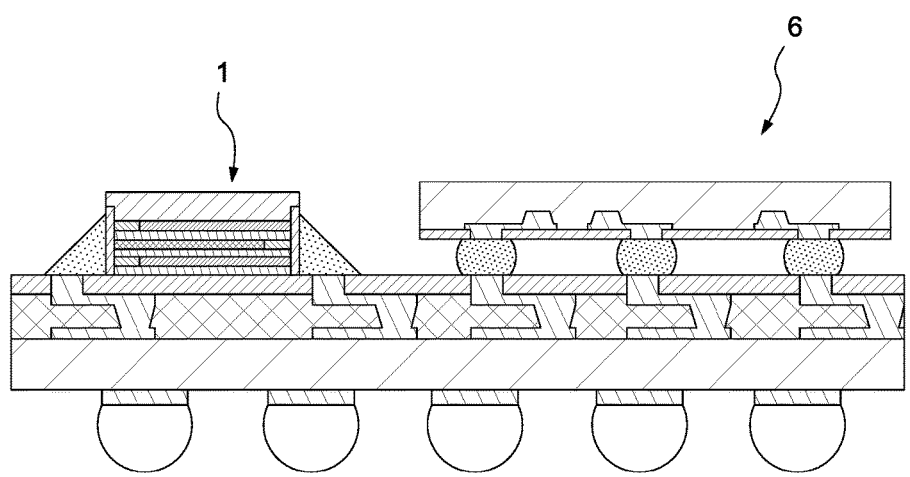
FIG. 8 is a cross-sectional view of a capacitor package structure in accordance with some embodiments of the present disclosure.

FIG. 8 is a cross-sectional view of a capacitor package structure 6 in accordance with some embodiments of the present disclosure. A capacitor structure 1 (e.g. as shown in FIG. 1) is electrically connected to a pad of a substrate having interconnect circuits disposed thereon.

Figure 9:
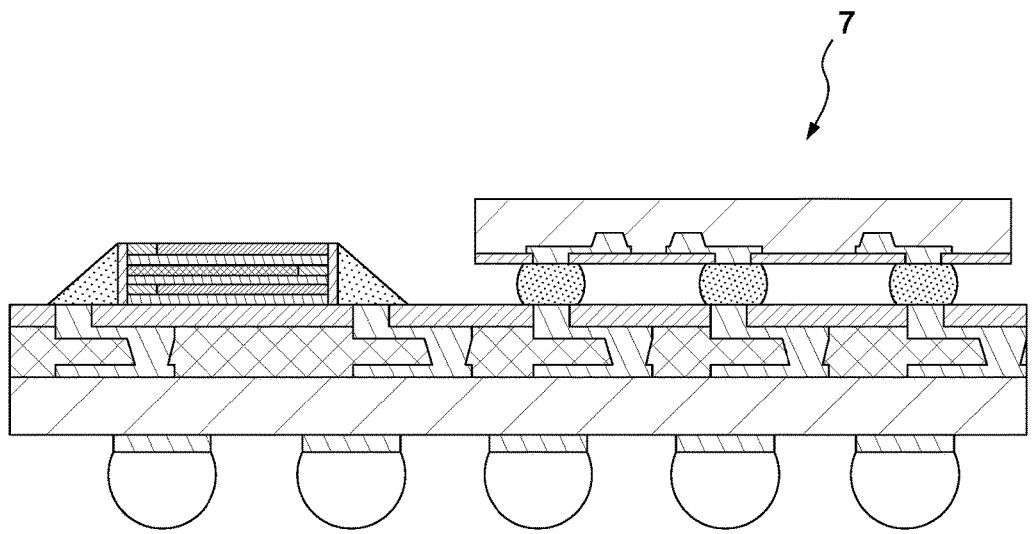
FIG. 9 is a cross-sectional view of a capacitor package structure in accordance with some embodiments of the present disclosure.

FIG. 9 is a cross-sectional view of a capacitor package structure 7 in accordance with some embodiments of the present disclosure. A capacitor structure 1 (e.g. as shown in FIG. 1, but omitting the substrate 10) is electrically connected to a pad of a substrate having interconnect circuits disposed thereon.

Figure 10:
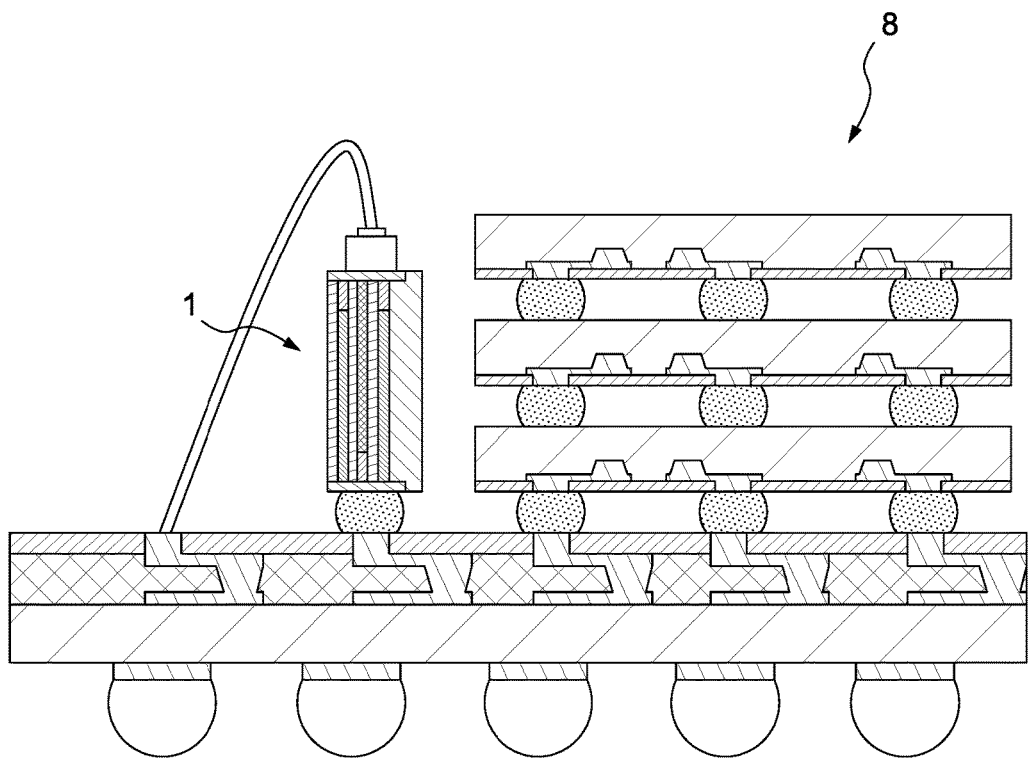
FIG. 10 is a cross-sectional view of a capacitor package structure in accordance with some embodiments of the present disclosure.

FIG. 10 is a cross-sectional view of a capacitor package structure 8 in accordance with some embodiments of the present disclosure. A capacitor structure 1 (e.g. as shown in FIG. 1) is electrically connected to a substrate having interconnect circuits disposed thereon through a wire bonding and a solder ball.

Figure 11:
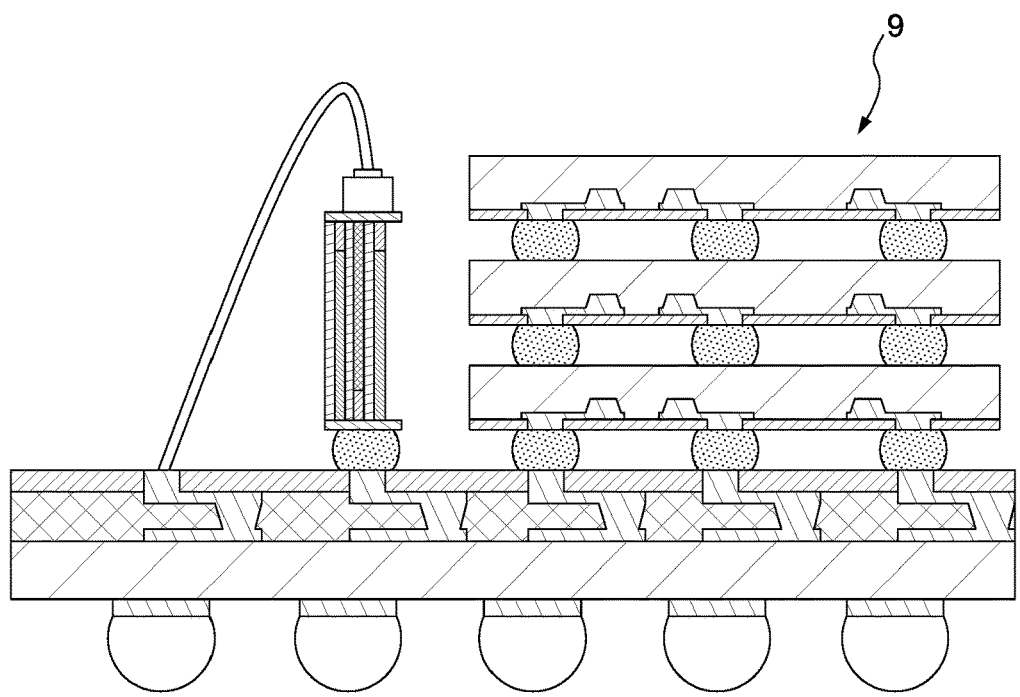
FIG. 11 is a cross-sectional view of a capacitor package structure in accordance with some embodiments of the present disclosure.

FIG. 11 is a cross-sectional view of a capacitor package structure 9 in accordance with some embodiments of the present disclosure. A capacitor structure 1 (e.g. as shown in FIG. 1, but omitting the substrate 10) is electrically connected to a substrate having interconnect circuits disposed thereon through a wire bonding and a solder ball.

Figure 12:
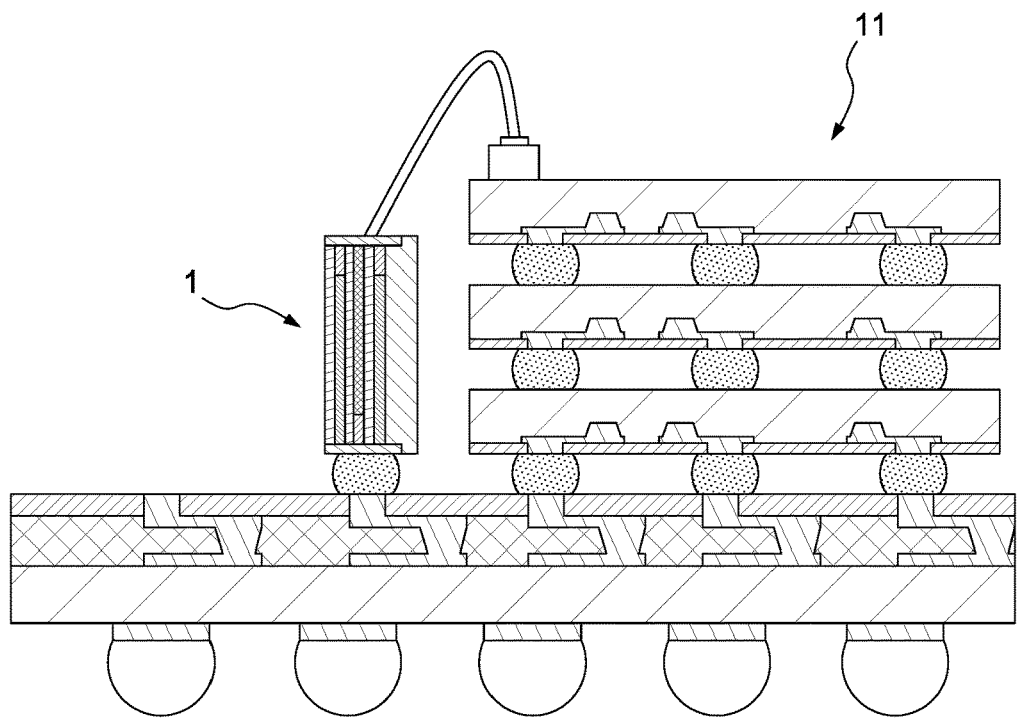
FIG. 12 is a cross-sectional view of a capacitor package structure in accordance with some embodiments of the present disclosure.

FIG. 12 is a cross-sectional view of a capacitor package structure 11 in accordance with some embodiments of the present disclosure. A capacitor structure 1 (e.g. as shown in FIG. 1) is electrically connected to a substrate having interconnect circuits disposed thereon through a wire bonding and a solder ball.

Figure 13:
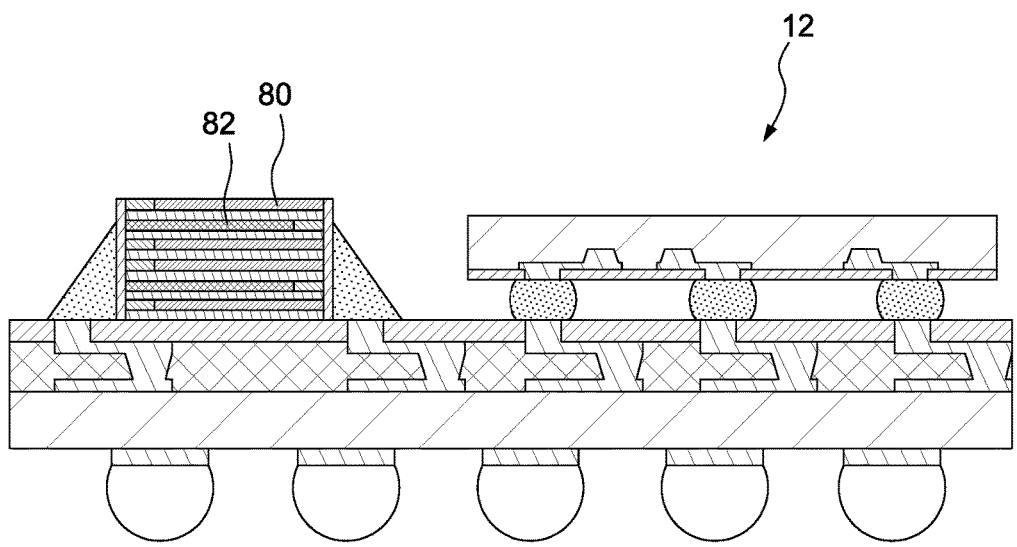
FIG. 13 is a cross-sectional view of a capacitor package structure in accordance with some embodiments of the present disclosure.

FIG. 13 is a cross-sectional view of a capacitor package structure 12 in accordance with some embodiments of the present disclosure. The capacitor package structure 12 includes a capacitor structure similar to that shown in FIG. 1, and including four conductive layers 80 and two conductive layers 82.

Figure 14:
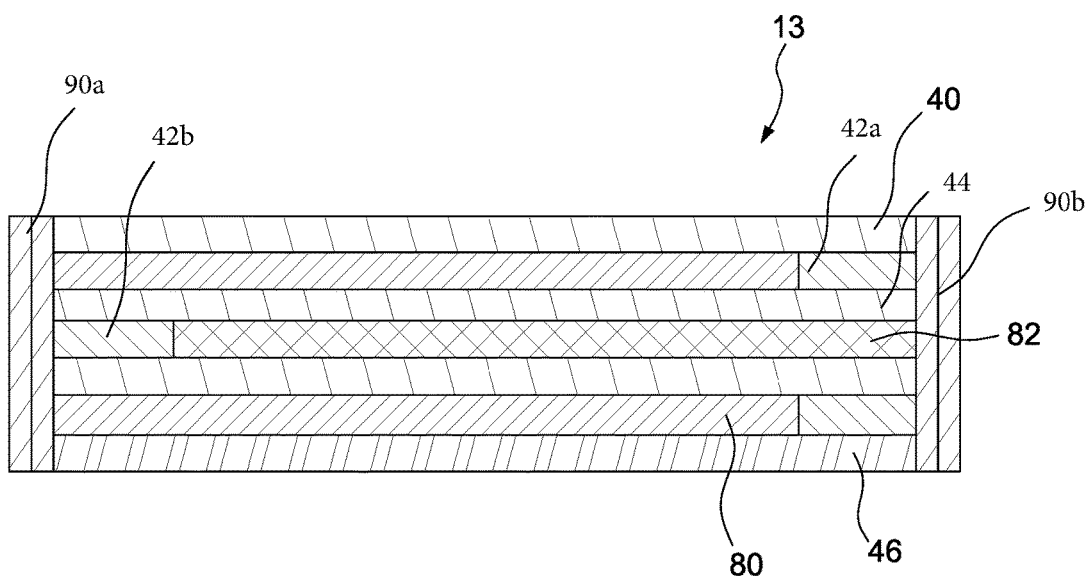
FIG. 14 is a cross-sectional view of a capacitor structure in accordance with some embodiments of the present disclosure.

FIG. 14 is a cross-sectional view of a capacitor structure 13 in accordance with some embodiments of the present disclosure. The capacitor structure 13 shown in FIG. 14 is similar to the capacitor structure 1 shown in FIG. 1, and redundant description of same-numbered components may be omitted with respect to FIG. 14. The capacitor structure 13 includes conductive layers 80, a conductive layer 82, dielectric layers 40, a dielectric layer 44, insulation layers 42a, an insulation layer 42b, an external contact 90a, an external contact 90b, and a protection layer 46. The capacitor structure 13 omits a substrate 10. A top outermost layer of the capacitor structure 13 is one of the dielectric layers 40 and a bottom outermost layer of the capacitor structure 13 is the protection layer 46.

Figure 15:
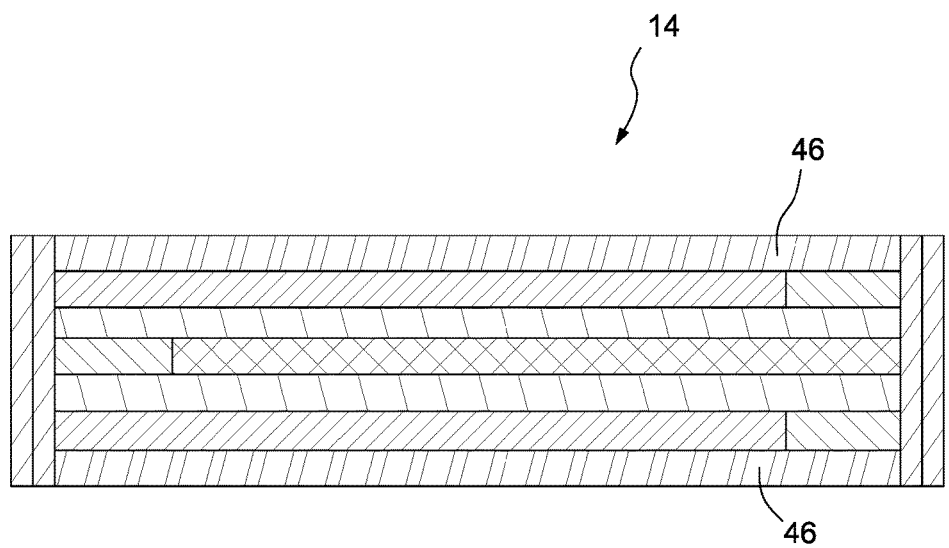
FIG. 15 is a cross-sectional view of a capacitor structure in accordance with some embodiments of the present disclosure.

FIG. 15 is a cross-sectional view of a capacitor structure 14 in accordance with some embodiments of the present disclosure. The capacitor structure 14 shown in FIG. 15 is similar to the capacitor structure 1 shown in FIG. 1, and redundant description of same-numbered components may be omitted with respect to FIG. 15. The capacitor structure 14 omits a substrate 10. The capacitor structure 14 includes a plurality of protection layers 46. A top outermost layer and a bottom outermost layer of the capacitor structure 14 are the protection layers 46.

Figure 16:
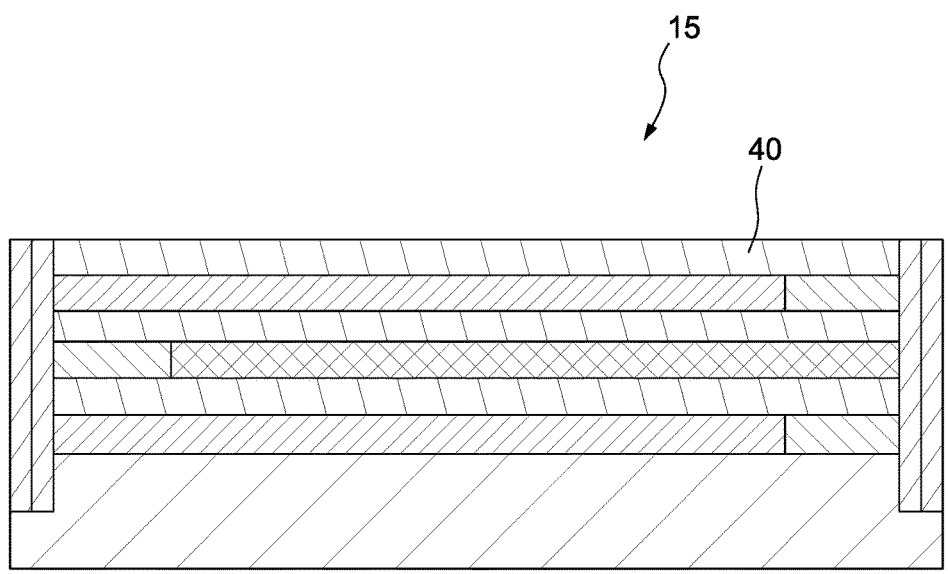
FIG. 16 is a cross-sectional view of a capacitor structure in accordance with some embodiments of the present disclosure.

FIG. 16 is a cross-sectional view of a capacitor structure 15 in accordance with some embodiments of the present disclosure. The capacitor structure 15 shown in FIG. 16 is similar to the capacitor structure 1 shown in FIG. 1, and redundant description of same-numbered components may be omitted with respect to FIG. 16. A top outermost layer of the capacitor structure 15 is a dielectric layer 40.

Figure 17:
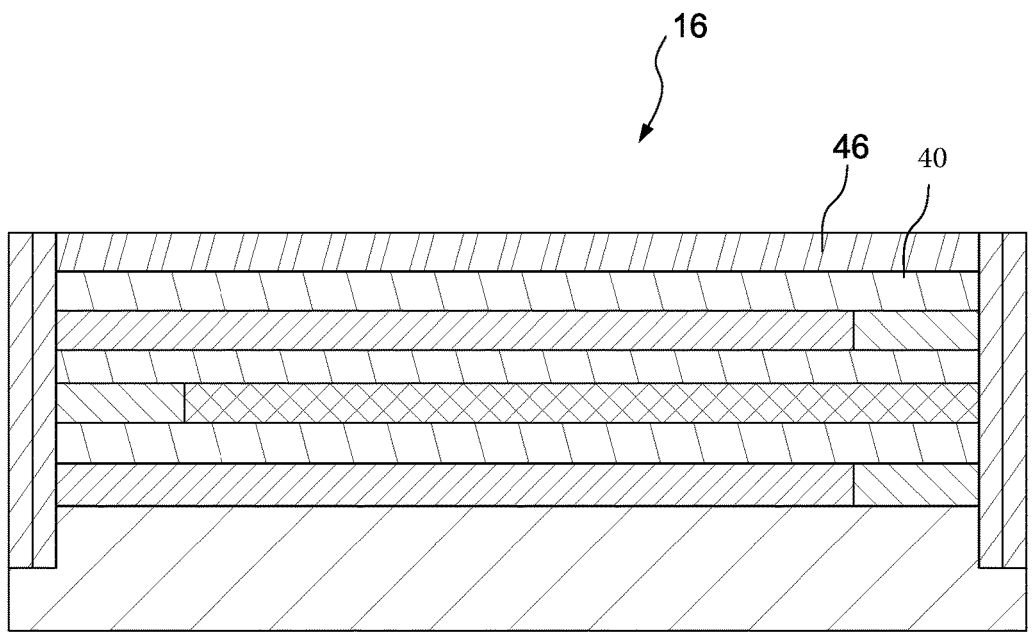
FIG. 17 is a cross-sectional view of a capacitor structure in accordance with some embodiments of the present disclosure.

FIG. 17 is a cross-sectional view of a capacitor structure 16 in accordance with some embodiments of the present disclosure. The capacitor structure 16 shown in FIG. 17 is similar to the capacitor structure 1 shown in FIG. 1, and redundant description of same-numbered components may be omitted with respect to FIG. 17. A top outermost layer of the capacitor structure 16 is a protection layer 46 which is disposed on a dielectric layer 40.

Figure 18A:
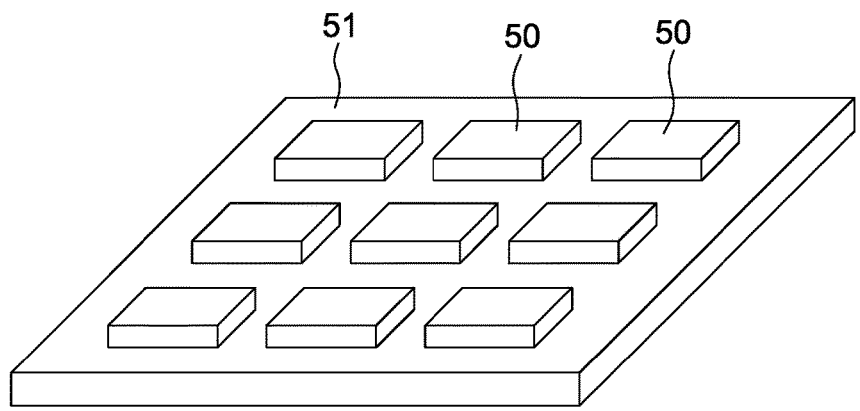
FIG. 18A and FIG. 18B illustrate different types of semiconductor package devices in accordance with some embodiments of the present disclosure.
Figure 18B:
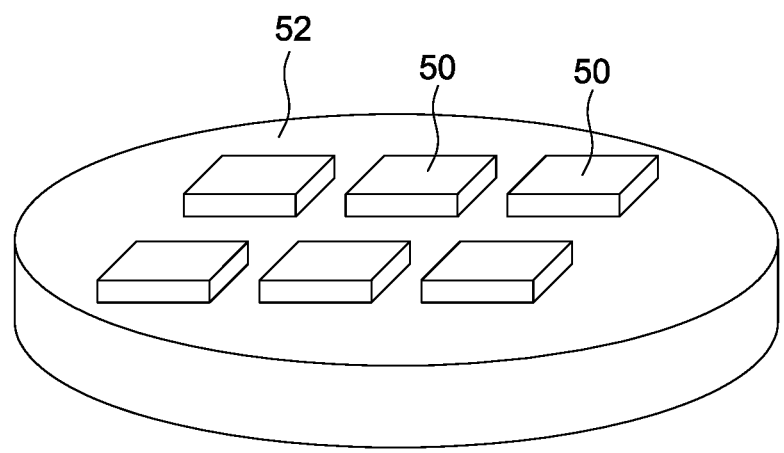

FIG. 18A and FIG. 18B illustrate different types of semiconductor package devices in accordance with some embodiments of the present disclosure.

As shown in FIG. 18A, a plurality of chips 50 or dies are placed on a substantially square-shaped carrier 51 (e.g. in accordance with one or more embodiments described herein). In some embodiments, the carrier 51 may include organic materials (e.g., a molding compound, bismaleimide triazine (BT), a PI, polybenzoxazole (PBO), a solder resist, an Ajinomoto build-up film (ABF), a polypropylene (PP) or an epoxy-based material) and/or inorganic materials (e.g., silicon, a glass, a ceramic or quartz).

As shown in FIG. 18B, a plurality of chips 50 or dies are placed on a substantially circle-shaped carrier 52 (e.g. in accordance with one or more embodiments described herein). In some embodiments, the carrier 52 may include organic materials (e.g., a molding compound, BT, a PI, PBO, a solder resist, an ABF, a PP or an epoxy-based material) and/or inorganic materials (e.g., silicon, a glass, a ceramic or quartz).

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a variation of less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be substantially, approximately, or about the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Two surfaces or sides can be deemed to be aligned if a displacement between the two surfaces is no greater than 0.5 µm, no greater than 1 µm, no greater than 5 µm, no greater than 10 µm, or no greater than 15 µm. As used herein, the singular terms "a," "an," and "the" may include plural referents unless the context clearly dictates otherwise. In the description of some embodiments, a component provided "on" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A capacitor structure, comprising:
    a first conductive layer comprising a first conductive material;
    a first insulation layer disposed adjacent to the first conductive layer in a same plane as the first conductive layer, wherein the first insulation layer includes an anisotropic conductive paste (ACP);
    a first dielectric layer on the first conductive layer and the first insulation layer; and
    a second conductive layer on the first dielectric layer and comprising a second conductive material,
    wherein the first conductive material is different from the second conductive material.

2. The capacitor structure of claim 1, further comprising a second insulation layer on the first dielectric layer and disposed adjacent to the second conductive layer in a same plane as the second conductive layer.

3. The capacitor structure of claim 2, wherein the first insulation layer or second insulation layer includes a photosensitive material.

4. The capacitor structure of claim 2, wherein the first insulation layer or second insulation layer includes a positive polyimide or a positive photoresist.

5. The capacitor structure of claim 1, further comprising:
    a substrate below the first conductive layer;

a first external contact electrically connected to the first conductive layer; and
a second external contact electrically connected to the second conductive layer,
wherein one of the first external contact or the second external contact extends in to the substrate.

6. The capacitor structure of claim 1, wherein the first conductive material comprises copper and the second conductive material comprises nickel.

7. The capacitor structure of claim 1, wherein the first conductive material comprises nickel and the second conductive material comprises copper.

8. The capacitor structure of claim 1, wherein the first conductive material comprises aluminum and the second conductive material comprises titanium.

9. The capacitor structure of claim 1, wherein the first conductive material comprises titanium and the second conductive material comprises aluminum.

10. The capacitor structure of claim 1, wherein the first conductive layer is formed by using a first etchant and wherein an etching rate for etching the first conductive layer using the first etchant is different from an etching rate for etching the second conductive layer using the first etchant.

11. The capacitor structure of claim 1, further comprising a second dielectric layer on the second conductive layer.

12. The capacitor structure of claim 11, wherein the second dielectric layer is an oxide of the second conductive material.

13. The capacitor structure of claim 1, wherein the first dielectric layer is an oxide of the first conductive material.

14. The capacitor structure of claim 1, wherein the first dielectric layer is opaque.

15. The capacitor structure of claim 1, further comprising a protection layer on the first dielectric layer.

16. The capacitor structure of claim 15, wherein the protection layer is opaque.

17. The capacitor structure of claim 1, wherein the ACP is a first ACP, and the capacitor structure further comprises:
a first external contact electrically connected to the first conductive layer; and
a second external contact electrically connected to the second conductive layer,
wherein the first external contact includes a second ACP.

18. The capacitor structure of claim 17, wherein the second external contact includes a third ACP.

19. A capacitor structure, comprising:
a first conductive layer;
a first insulation layer disposed adjacent to the first conductive layer in a same plane as the first conductive layer and comprising a first dielectric material, wherein the first insulation layer includes an anisotropic conductive paste (ACP);
a first dielectric layer on the first conductive layer and the first insulation layer and comprising a second dielectric material; and
a second conductive layer on the first dielectric layer, wherein the first dielectric material is different from the second dielectric material.

20. The capacitor structure of claim 19, further comprising a second insulation layer on the first dielectric layer and disposed adjacent to the second conductive layer in a same plane as the second conductive layer.

21. The capacitor structure of claim 20, wherein the first insulation layer or the second insulation layer includes a photosensitive material.

22. The capacitor structure of claim 20, wherein the first insulation layer or second insulation layer includes a positive polyimide or a positive photoresist.

23. The capacitor structure of claim 19, wherein the first conductive layer comprises copper and the second conductive layer comprises nickel.

24. The capacitor structure of claim 19, wherein the first conductive layer comprises aluminum and the second conductive layer comprises titanium.

25. The capacitor structure of claim 19, further comprising a second dielectric layer, wherein the first dielectric layer is in contact with the second conductive layer and wherein the second dielectric layer is on the second conductive layer.

26. The capacitor structure of claim 25, wherein the second dielectric layer is an oxide of the second conductive layer.

27. The capacitor structure of claim 25, wherein the first and second dielectric layers are opaque.

28. The capacitor structure of claim 25, further comprising a protection layer on the second dielectric layer.

29. The capacitor structure of claim 28, wherein the protection layer is opaque.

30. The capacitor structure of claim 19, wherein the first dielectric layer is an oxide of the first conductive layer.

31. A capacitor structure, comprising:
a first conductive layer;
a first insulation layer disposed adjacent to the first conductive layer in a same plane as the first conductive layer, wherein the first insulation layer includes an anisotropic conductive paste (ACP);
a first dielectric layer on the first conductive layer and the first insulation layer;
a second conductive layer on the first dielectric layer; and
a first external contact electrically connected to the first conductive layer and comprising a first layer and a second layer.

32. The capacitor structure of claim 31, further comprising a second insulation layer, and wherein a material of the first dielectric layer is different from a material of the first insulation layer and a material of the second insulation layer.

33. The capacitor structure of claim 31, further comprising a second external contact electrically connected to the second conductive layer and comprising a first layer and a second layer.

* * * * *